United States Patent
Kano et al.

(10) Patent No.: US 7,426,971 B2
(45) Date of Patent: Sep. 23, 2008

(54) HYBRID DRIVING UNIT AND VEHICLE CARRYING THE SAME

(75) Inventors: Seigo Kano, Aichi-ken (JP); Kenji Omote, Aichi-ken (JP); Satoru Wakuta, Aichi-ken (JP); Tomochika Inagaki, Aichi-ken (JP); Masatoshi Adachi, Aichi-ken (JP); Masahiro Kojima, Aichi-ken (JP)

(73) Assignees: Toyota Jidosha Kabushiki Kaisha, Aichi-ken (JP); Aisin Aw Co., Ltd., Aichi-ken (JP)

( * ) Notice: Subject to any disclaimer, the term of this patent is extended or adjusted under 35 U.S.C. 154(b) by 118 days.

(21) Appl. No.: 10/532,864

(22) PCT Filed: Jun. 30, 2004

(86) PCT No.: PCT/JP2004/009201

§ 371 (c)(1),
(2), (4) Date: Dec. 12, 2005

(87) PCT Pub. No.: WO2005/000620

PCT Pub. Date: Jan. 6, 2005

(65) Prior Publication Data

US 2006/0201725 A1    Sep. 14, 2006

(30) Foreign Application Priority Data

Jun. 30, 2003  (JP)  ............................ 2003-189115

(51) Int. Cl.
*B60K 1/00*  (2006.01)
(52) U.S. Cl. ................. 180/65.2; 180/65.3; 180/65.6; 475/2; 475/5; 475/10; 903/905; 903/906

(58) Field of Classification Search ............... 180/65.1, 180/65.2, 65.3, 65.4, 65.5, 65.6, 65.7, 65.8; 903/951, 905, 906, 911; 475/230, 231, 2, 475/5, 10
See application file for complete search history.

(56) References Cited

U.S. PATENT DOCUMENTS

| | | | | |
|---|---|---|---|---|
| 3,620,323 A | * | 11/1971 | Maeda et al. | ............... 180/65.2 |
| 3,623,568 A | | 11/1971 | Mori | |
| 4,884,650 A | * | 12/1989 | Fujiki et al. | .................. 180/197 |
| 4,938,306 A | * | 7/1990 | Sumiyoshi et al. | .......... 180/233 |
| 5,353,889 A | * | 10/1994 | Hamada | ..................... 180/242 |
| 5,513,719 A | * | 5/1996 | Moroto et al. | ............. 180/65.4 |
| 5,904,631 A | | 5/1999 | Morisawa et al. | |
| 5,988,307 A | * | 11/1999 | Yamada et al. | ............... 180/243 |

(Continued)

FOREIGN PATENT DOCUMENTS

DE    197 17 884 A1    2/1998

(Continued)

*Primary Examiner*—Hau V Phan
(74) *Attorney, Agent, or Firm*—Sughrue Mion, PLLC

(57) ABSTRACT

A hybrid driving unit in which a first electric motor (20), a second electric motor (23), a transmission (22) and a power splitting planetary gear (21) are disposed in order from the front side (the side of an internal combustion engine) on an axis within a casing member (14). Since the first electric motor (20) and the second electric motor (23) are disposed adjacently to each other, partial cases for storing these first and second electric motors (20) and (23) may be combined, thus facilitating the accommodation for producing the unit in series.

26 Claims, 13 Drawing Sheets

U.S. PATENT DOCUMENTS

| | | | |
|---|---|---|---|
| 6,002,979 A * | 12/1999 | Ishizu | 701/86 |
| 6,041,877 A * | 3/2000 | Yamada et al. | 180/65.2 |
| 6,067,801 A * | 5/2000 | Harada et al. | 60/705 |
| 6,155,364 A * | 12/2000 | Nagano et al. | 180/65.2 |
| 6,190,283 B1 * | 2/2001 | Uchida | 477/5 |
| 6,258,006 B1 * | 7/2001 | Hanyu et al. | 477/5 |
| 6,321,865 B1 * | 11/2001 | Kuribayashi et al. | 180/243 |
| 6,378,638 B1 * | 4/2002 | Mizon et al. | 180/65.6 |
| 6,527,659 B1 * | 3/2003 | Klemen et al. | 475/5 |
| 6,852,053 B2 * | 2/2005 | Nakano et al. | 475/5 |
| 7,174,978 B2 * | 2/2007 | Taniguchi et al. | 180/65.1 |
| 2003/0064854 A1 | 4/2003 | Kotani | |
| 2004/0084233 A1 | 5/2004 | Wakuta et al. | |

FOREIGN PATENT DOCUMENTS

| | | |
|---|---|---|
| EP | 1 142 744 A1 | 10/2001 |
| EP | 1 253 036 A1 | 10/2002 |
| JP | 47-31773 | 8/1972 |
| JP | 06-144020 A | 5/1994 |
| JP | 07-135701 A | 5/1995 |
| JP | 08-183347 A | 7/1996 |
| JP | 10-058990 A | 3/1998 |
| JP | 2000-346187 A | 12/2000 |
| JP | 2002-225578 A | 8/2002 |
| JP | 2003-191761 A | 7/2003 |
| WO | WO 03/055709 A1 | 12/2002 |

* cited by examiner

US 7,426,971 B2

HYBRID DRIVING UNIT AND VEHICLE CARRYING THE SAME

TECHNICAL FIELD

The present invention relates to a vehicular hybrid driving unit and a vehicle carrying the same and more specifically to a layout of two electric motors, a power splitting planetary gear and a transmission disposed within a casing member.

BACKGROUND ART

Hitherto, there has been known a so-called mechanical power splitting (split type or two-motor type) hybrid driving unit, to be mounted to a vehicle, in which an engine, a generator (second electric motor) and a driving (assist) electric motor (second electric motor) are connected respectively to three elements of a planetary gear unit, the second electric motor is coupled with an output shaft, output torque of the above-mentioned planetary gear unit is continuously controlled through control of the first electric motor, and torque of the second electric motor is combined with the output torque of the planetary gear to be outputted to the output shaft as necessary.

The hybrid driving unit described above is disclosed, for instance, in Japanese Patent Laid-Open No. Hei.08-183347 as a unit for an FF (front-engine and front-drive) type vehicle and in Japanese Patent Laid-Open No. 2002-225578 as a unit provided with a transmission between an electric motor and an output shaft.

By the way, the position and direction of the hybrid driving unit to be mounted and the shape of the casing member will differ from those of the FF type vehicle in mounting such unit to an FR (front-engine and rear-drive) vehicle.

In case of the FR type vehicle, an internal combustion engine, a hybrid driving unit and a propeller shaft are disposed in line in order from the front side in the longitudinal direction of a body. That is, a crankshaft of the engine, input and output shafts of the hybrid driving unit and the propeller shaft are disposed almost in one and same axial line. In the hybrid driving unit, a first electric motor, a second electric motor, a power splitting planetary gear and a transmission are axially stored within the casing member and a plurality of partial cases divided in the longitudinal direction of the casing member to improve the assembily of those devices need to be jointed.

Meanwhile, taking the production of the hybrid driving unit in series and the mountability thereof to a body into consideration, it is preferable to dispose the two electric motors adequately corresponding to the specification of the vehicle to which the hybrid driving unit is mounted and of the internal combustion engine to which it is combined from the aspect of the cost performance.

However, because the casing member is divided into the plurality of parts in the hybrid driving unit described above, there is a case of causing a misalignment of the axial center of the casing member. Thereby, the accuracy for supporting rotors of the first and second electric motors may drop, possibly causing vibration due to swirling of the axis. Still more, because the first and second electric motors are stored in the different parts of the case, respectively, it is necessary to provide new casing members corresponding to the two electric motors. Accordingly, it has been disadvantageous for producing the above-mentioned hybrid driving unit in series in accommodating the unit to the FR type vehicle.

DISCLOSURE OF INVENTION

It is therefore an object of the invention to provide a hybrid driving unit, and a vehicle carrying the same, solving the aforementioned problems by disposing first and second electric motors adjacently to each other.

According to a first aspect of the invention, a hybrid driving unit (7A, 7B) comprises:

an input shaft (10) for inputting motive power from an internal combustion engine (5);

an output shaft (12) disposed on an axis (13) in line with the input shaft (10) and interlocked with driving wheels (3);

a first electric motor (20) disposed on the axis (13) and having a stator and a rotor (25);

a power splitting planetary gear (21) disposed on the axis (13) and having a first rotary element (R0) coupled with the input shaft (10), a second rotary element (S0) coupled with the rotor (25) of the first electric motor (20) and a third rotary element (CR0) coupled with the output shaft (12);

a second electric motor (23) disposed on the axis (13) and having a stator (28) and a rotor (29); and a transmission (22) disposed on the axis (13) and shifting and transmitting revolution of the rotor (29) of the second electric motor (23) to the output shaft (12); and the hybrid driving unit (7A, 7B) being characterized in that:

the first electric motor (20), the power splitting planetary gear (21), the second electric motor (23) and the transmission (22) are stored in a casing member (14) while being disposed in line on the axis (13);

the stators (24 and 28) of the first and second electric motors (20 and 23) are fixed to the casing member (14); and the first electric motor (20), the power splitting planetary gear (21), the second electric motor (23) and the transmission (22) are disposed on the axis (13) so that the first electric motor (20) and the second electric motor (23) adjoin each other on the axis (13).

According to a second aspect of the invention, the hybrid driving unit (7A, 7B) is characterized in that the casing member (14) is built by connecting a plurality of partial cases in a body in the axial direction and the first and second electric motors (20, 23) are stored in one of the partial cases.

According to a third aspect of the invention, the hybrid driving unit (7A, 7B) is characterized in that the casing member (14) has a joint section (H) of the partial cases (14A, 14B) at the part where the transmission (22) and the power splitting planetary gear (21) are stored.

According to a fourth aspect of the invention, the hybrid driving unit (7A) is characterized in that the partial case (14A) storing the first and second electric motors (20, 23) is divided into a front part close to the internal combustion engine (5) and to a rear part by a partition (supporting member B) and the radial size of a motor storage section (14A1) of the front part is larger than that of a motor storage section (14A2) of the rear part.

According to a fifth aspect of the invention, the hybrid driving unit (7A) is characterized in that partitions (supporting members A, B and C) extending from the casing member (14) support the both sides of the rotors (25, 29) of the first and second electric motors (20, 23) through an intermediary of bearing members (a, b, f and g) and the partition (B) between the first electric motor (20) and the second electric motor (23) is utilized in common and has bearing members (b, h) supporting the rotors (25, 29) of the first and second electric motors (20, 23), respectively.

According to a sixth aspect of the invention, the hybrid driving unit (7A, 7B) is characterized in that the input shaft

(10) is supported by the inner peripheral face of the rotor (25) of the first electric motor (20) through an intermediary of bearing members (c, d) provided on the outer peripheral face of the input shaft (10).

According to a seventh aspect of the invention (see FIGS. 2 through 6 for example), the hybrid driving unit (7A) is characterized in that the first electric motor (20), the second electric motor (23), the transmission (22) and the power splitting planetary gear (21) are disposed in order from the side closer to the internal combustion engine (5).

According to an eighth aspect of the invention (see FIG. 2 for example), the hybrid driving unit (7A) is characterized in that the input shaft (10) is coupled with the first rotary element (R0) through the inner periphery of the first electric motor (20), the second electric motor (23) and the transmission (22), and the output element (CR1) of the transmission (22) is coupled with the output shaft (12) through the outer periphery of the power splitting planetary gear (21).

According to an ninth aspect of the invention (see FIG. 2 for example), the hybrid driving unit (7A) is characterized in that the power splitting planetary gear (21) is composed of a single pinion planetary gear; the input shaft (10) is coupled with the rear side of a carrier (CR0) of the single pinion planetary gear through the inner periphery of the power splitting planetary gear (21); the output shaft (12) is coupled with the output element (CR1) of the transmission (22) via a ring gear (R0) of the single pinion planetary gear; and the rotor (25) of the first electric motor (20) is coupled with a sun gear (S0) of the single pinion planetary gear through the inner periphery of the second electric motor (23) and the transmission (22).

According to a tenth aspect of the invention (see FIG. 4 for example), the hybrid driving unit (7A) is characterized in that the power splitting planetary gear (21) is composed of the single pinion planetary gear; the input shaft (10) is coupled with the transmission side of the carrier (CR0) of the single pinion planetary gear; the output shaft (12) is coupled with the sun gear (S0) of the single pinion planetary gear and with the output element (CR1) of the transmission (22) through the outer periphery of the power splitting planetary gear (21); and the rotor (25) of the first electric motor (20) is coupled with the ring gear (R0) of the single pinion planetary gear through the inner periphery of the second electric motor (23) and the transmission (22).

According to an eleventh aspect of the invention (see FIG. 5 for example), the hybrid driving unit (7A) is characterized in that the power splitting planetary gear (21) is composed of a double pinion planetary gear; the input shaft (10) is coupled with a ring gear (R0) of the double pinion planetary gear through the rear side of the power splitting planetary gear (21); the output shaft (12) is coupled with the transmission side of a carrier (CR0) of the double pinion planetary gear through the outer periphery of the power splitting planetary gear (21) and with the output element (CR1) of the transmission (22); and the rotor (25) of the first electric motor (20) is coupled with a sun gear (S0) of the double pinion planetary gear through the inner periphery of the second electric motor (23) and the transmission (22).

According to a twelfth aspect of the invention (see FIG. 6 for example), the hybrid driving unit (7A) is characterized in that the power splitting planetary gear (21) is composed of the double pinion planetary gear; the input shaft (10) is coupled with the ring gear (R0) of the double pinion planetary gear through the rear side of the power splitting planetary gear (21); the output shaft (12) is coupled with the sun gear (S0) of the double pinion planetary gear and with the output element (CR1) of the transmission (22) through the outer periphery of the power splitting planetary gear (21) and between the power splitting planetary gear (21) and the transmission (22); and the rotor (25) of the first electric motor (20) is coupled with the rear side of the carrier (CR0) of the double pinion planetary gear through the inner periphery of the second electric motor (23) and the transmission (22).

According to a thirteenth aspect of the invention (see FIGS. 7 through 11 for example), the hybrid driving unit (7B) is characterized in that the first electric motor (20), the second electric motor (23), the power splitting planetary gear (21) and the transmission (22) are disposed in order from the side closer to the internal combustion engine (5).

According to a fourteenth aspect of the invention (see FIG. 7 for example), the hybrid driving unit (7B) is characterized in that the input shaft (10) is coupled with the first rotary element (CR0) through the inner periphery of the first electric motor (20) and the second electric motor (23); the rotor (29) of the second electric motor (23) is coupled with the transmission (22) through the outer periphery of the power splitting planetary gear (21); and the output shaft (12) is coupled with the output element (CR1) of the transmission (22) and with the third rotary element (R0) through the inner periphery of the transmission (22).

According to a fifteenth aspect of the invention (see FIG. 7 for example), the hybrid driving unit (7B) is characterized in that the power splitting planetary gear (21) is composed of a single pinion planetary gear; the input shaft (10) is coupled with the transmission side of the carrier (CR0) of the single pinion planetary gear through the inner periphery of the power splitting planetary gear (21); the output shaft (12) is coupled with the output element (CR1) of the transmission (22) and with the ring gear (R0) of the single pinion planetary gear through between the power splitting planetary gear (21) and the transmission (22); the rotor (25) of the first electric motor (20) is coupled with the sun gear (S0) of the single pinion planetary gear through the inner periphery of the second electric motor (23); and the rotor (29) of the second electric motor (23) is coupled with an input element (S1) of the transmission (22) through the outer periphery of the power splitting planetary gear (21).

According to a sixteenth aspect of the invention (see FIG. 9 for example), the hybrid driving unit (7B) is characterized in that the power splitting planetary gear (21) is composed of a single pinion planetary gear; the input shaft (10) is coupled with the second electric motor side of the carrier (CR0) of the single pinion planetary gear; the output shaft (12) is coupled with the output element (CR1) of the transmission (22) and with the sun gear (S0) of the single pinion planetary gear; the rotor (25) of the first electric motor (20) is coupled with the ring gear (R0) of the single pinion planetary gear through between the second electric motor (23) and the power splitting planetary gear (21); and the rotor (29) of the second electric motor (23) is coupled with the input element (S1) of the transmission (22) through the outer periphery of the power splitting planetary gear (21).

According to a seventeenth aspect of the invention (see FIG. 10 for example), the hybrid driving unit (7B) is characterized in that the power splitting planetary gear (21) is composed of a double pinion planetary gear; the input shaft (10) is coupled with the ring gear (R0) of the double pinion planetary gear through between the power splitting planetary gear (21) and the transmission (22); the output shaft (12) is coupled with the output element (CR1) of the transmission (22) and with the sun gear (S0) of the double pinion planetary gear through between the power splitting planetary gear (21) and the transmission (22), through the outer periphery of the power splitting planetary gear (21) and through between the power splitting planetary gear (21) and the second electric motor (23); the rotor (25) of the first electric motor (20) is coupled with the transmission (22) side of the carrier (CR0) of the double pinion planetary gear through the inner peripheral side of the second electric motor (23) and through between the power splitting planetary gear (21) and the transmission (22); and the rotor (29) of the second electric motor (23) is coupled with the input element (S1) of the transmission (22) through the outer periphery of the power splitting planetary gear (21).

According to an eighteenth aspect of the invention (see FIG. 11 for example), the hybrid driving unit (7B) is characterized in that the power splitting planetary gear (21) is composed of a double pinion planetary gear; the input shaft (10) is coupled with the carrier (CR0) of the double pinion planetary gear through between the power splitting planetary gear (21) and the transmission (22); the output shaft (12) is coupled with the output element (CR1) of the transmission (22) and with the ring gear (R0) of the double pinion planetary gear through between the power splitting planetary gear (21) and the transmission (22); the rotor (25) of the first electric motor (20) is coupled with the sun gear (S0) of the double pinion planetary gear through the inner peripheral side of the second electric motor (23); and the rotor (29) of the second electric motor (23) is coupled with the input element (S1) of the transmission (22) through the outer peripheral side of the power splitting planetary gear (21).

According to a nineteenth aspect of the invention, the hybrid driving unit (7A, 7B) is characterized in that the transmission (22) has a planetary gear unit (27).

According to a 20-th aspect of the invention, the hybrid driving unit (7A, 7B) is characterized in that the transmission (22) has at least four shifting elements (S1, S2, R1, CR1), the first shifting element (S1) is coupled with the rotor (29) of the second electric motor (23), the second shifting element (CR1) is coupled with the output shaft (12), and the transmission (22) has braking elements (B1 and B2) which are capable of fixing the third and fourth shifting elements (R1 and S2) to the casing member (14), respectively.

According to a 21-st aspect of the invention, the hybrid driving unit (7A, 7B) is characterized in that the planetary gear of the transmission (22) is composed of a Ravigneaux type planetary gear and a carrier (CR1) of the Ravigneaux type planetary gear is coupled with the output shaft (12).

According to a 22-nd aspect of the invention (see FIG. 12 for example), the hybrid driving unit (7C) is characterized in that the power splitting planetary gear (21), the first electric motor (20), the second electric motor (23) and the transmission (22) are disposed in order from the side closer to the internal combustion engine (5).

According to a 23-rd aspect of the invention, the hybrid driving unit is characterized in that the input shaft (10) is coupled with the first rotary element (R0), and the output element (CR1) of the transmission (22) is coupled with the output shaft (12) disposed through the inner periphery of the power splitting planetary gear (21), the first electric motor (20), the second electric motor (23) and the transmission (22).

According to a 24-th aspect of the invention (see FIG. 13 for example), the hybrid driving unit (7D) is characterized in that the transmission (22), the second electric motor (23), the first electric motor (20) and the power splitting planetary gear (21) are disposed in order from the side closer to the internal combustion engine (5).

According to a 25-th aspect of the invention, the hybrid driving unit (7D) is characterized in that the input shaft (10) is coupled with the first rotary element (R0) through the inner peripheral side of the transmission (22), the second electric motor (23), the first electric motor (20) and the power splitting planetary gear (21), and the output element (CR1) of the transmission (22) is coupled with the output shaft (12) through between the input shaft (10) and the inner periphery of the transmission (22), the second electric motor (23), the first electric motor (20) and the power splitting planetary gear (21).

According to a 26-th aspect of the invention, a vehicle (1) comprising an internal combustion engine (5), hybrid driving means and rear wheels (3) as driving wheels to which driving force is transmitted from the hybrid driving means is characterized in that the hybrid driving means is the hybrid driving unit (7A, 7B) described in anyone of the first to 25-th aspects of the invention in which the input shaft (10) is coupled with an output shaft (6) of the internal combustion engine (5), a propeller shaft (16) is coupled with the output shaft (6), and the output shaft (6) of the internal combustion engine, the input shaft (10), the output shaft (12) and the propeller shaft (16) are disposed approximately on one and same axis.

It is noted that the reference characters within the parentheses described above are cited for the purpose of collating with the drawings and do not by any means affect the composition of the claims.

According to the first aspect of the invention, since the first electric motor and the second electric motor are disposed adjacently to each other on the axis, the first and second electric motors may be stored within one member (a partial case described later), thus facilitating the accommodation to producing the unit in series.

According to the second aspect of the invention, since the first and second electric motors may be stored in a body in one partial case, a number of parts and hence the cost of the unit may be reduced. It also enables improved accuracy for supporting the first and second electric motors. Still more, it enables the length of power cables of the first and second electric motors to be almost equalized regardless of the position of a controller for controlling them.

According to the third aspect of the invention, since the casing member is divided at the part where the transmission and the power splitting planetary gear are stored, the transmission and the power splitting planetary gear may be readily assembled while storing the first and second electric motors in one partial case.

According to the fourth aspect of the invention, since the radial size of the front (on the internal combustion engine side) motor storage section of the partial case for storing the first and second electric motors is set larger than that of the rear side, the mountability to the body of the FR-type vehicle is improved.

According to the fifth aspect of the invention, since the supporting members (partitions) extending from the casing member support the both sides of the rotors of the first and second electric motors through an intermediary of the bearing members and hence the accuracy for supporting the rotors improves, the gap between the stator and the rotor may be reduced and an output of the electric motors may be improved. Still more, since the supporting member (partition) between the first and second electric motors is utilized in common, the length of the hybrid driving unit in the longitudinal direction may be shortened. Furthermore, since the partition is provided with the bearing members for supporting the rotors of the first and second electric motors, respectively, it becomes possible to steadily support the rotors of the first and second electric motors.

According to the sixth aspect of the invention, since the input shaft is supported by the inner peripheral face of the rotor of the first electric motor through the intermediary of the bearings provided on the outer peripheral face of the input shaft, the input shaft may be securely supported by the rotor which is securely supported by the supporting members even if the input shaft is passed through the inner periphery of the two electric motors and the axial length thereof increases. Accordingly, it enables the rigidity of the output shaft to be assured and the diameter thereof to be suppressed, thus enabling the diameter of the hybrid driving unit to be reduced.

According to the seventh aspect of the invention, since the diameter of the first and second electric motors may be increased by disposing them on the front side while storing in one partial case by disposing the first electric motor, the second electric motor, the transmission and the power splitting planetary gear in order from the side closer to the internal combustion engine, the axial length of the unit may be shortened while assuring the output of the first and second electric motors. Still more, since the transmission and the power splitting planetary gear whose diameter may be reduced as compared to the electric motors are disposed on the rear side, the diameter of the rear end part of the hybrid driving unit may be reduced and the mountability of the hybrid driving unit to the vehicle may be improved. Since the power splitting planetary gear whose diameter may be reduced as compared to the transmission is provided at the rearmost end, the diameter of the rear end of the hybrid driving unit may be reduced further.

It is noted that the invention may be achieved without complicating the disposition by coupling the first electric motor, the second electric motor, the power splitting planetary gear and the transmission as described in the eighth to twelfth aspects of the invention.

According to the thirteenth aspect of the invention, since the diameter of the first and second electric motors may be increased by disposing them on the front side while storing in one partial case by disposing the first electric motor, the second electric motor, the power splitting planetary gear and the transmission in order from the side closer to the internal combustion engine, the axial length of the unit may be shortened while assuring the output of the first and second electric motors. Still more, since the power splitting planetary gear and the transmission whose diameter may be reduced as compared to the electric motors are disposed on the rear side, the diameter of the rear end part of the hybrid driving unit may be reduced and the mountability of the hybrid driving unit to the vehicle may be improved. Further, since the input shaft coupled with the power splitting planetary gear may be shortened as compared to the case of providing the power splitting planetary gear in the rearmost part by disposing the power splitting planetary gear on the front side of the transmission, i.e., on the side of the first and second electric motors, the input shaft may be readily machined and whose accuracy may be improved.

It is noted that the invention may be achieved without complicating the disposition by coupling the first electric motor, the power splitting planetary gear, the second electric motor and the transmission as described in the fourteenth to eighteenth aspects of the invention.

According to the nineteenth aspect of the invention, since the transmission is composed of the planetary gear and may be provided on one axis, the diameter of the hybrid driving unit may be reduced.

According to the 20-th aspect of the invention, since the transmission has at least four shifting elements, the first shifting element is coupled with the rotor of the second electric motor, the second shifting element is coupled with the output shaft, and the transmission has braking elements which are capable of fixing the third and fourth shifting elements to the case, respectively, it is possible to reduce the rotational speed of the rotor of the second electric motor at least at two stages just by providing the brakes. If a clutch is used here to shift the speeds, a hydraulic servo of the clutch is provided on the center axis in general to supply oil to the hydraulic servo of the clutch and a plurality of seal rings are used to prevent leakage of oil between rotational members. In contrary to that, because the hydraulic servo of the inventive brake may be provided within the case, no seal ring is required like the clutch and the hydraulic servo needs not be provided on the center axis. Accordingly, because the axial length of the hybrid driving unit may be shortened by composing the two stages of shift just by the brakes, the rigidity of the case is improved and the efficiency thereof may be improved through the reduction of the seal rings.

According to the 21-st aspect of the invention, the planetary gear of the transmission is composed of the Ravigneaux type planetary gear. Because the Ravigneaux type planetary gear allows the carriers of two planetary gears to be used in common, the axial length of the transmission may be shortened. Still more, although the size of the carrier increases by coupling the carrier with the output shaft and by commonly using the carriers of the two planetary gears, it is possible to suppress vibration caused by whirling of the transmission because the carrier may be securely supported by coupling the carrier with the output shaft.

According to the 22-nd aspect of the invention, since the power splitting planetary gear, the first electric motor, the second electric motor and the transmission are disposed in order from the side closer to the internal combustion engine, the first electric motor and the second electric motor may be stored in one partial case. Still more, because the two electric motors adjoin each other, a mechanism for cooling the electric motors may be built in compact.

The invention may be achieved without complicating the disposition by coupling the power splitting planetary gear, the first electric motor, the second electric motor and the transmission as described in the 23-rd aspect of the invention.

According to the 24-th aspect of the invention, since the second electric motor, the first electric motor, the power splitting planetary gear and the transmission are disposed in order from the side closer to the internal combustion engine, the first electric motor and the second electric motor may be stored in one partial case. Still more, because the two electric motors adjoin each other, a mechanism for cooling the electric motors may be built in compact.

The invention may be achieved without complicating the disposition by coupling the transmission, the second electric motor, the first electric motor and the transmission as described in the 25-th aspect of the invention.

The 26-th aspect of the invention relates to the FR-type vehicle carrying the inventive hybrid driving unit. The inventive vehicle allows the mountability of the hybrid driving unit to be improved.

BEST MODES FOR CARRYING OUT THE INVENTION

Figure 1:
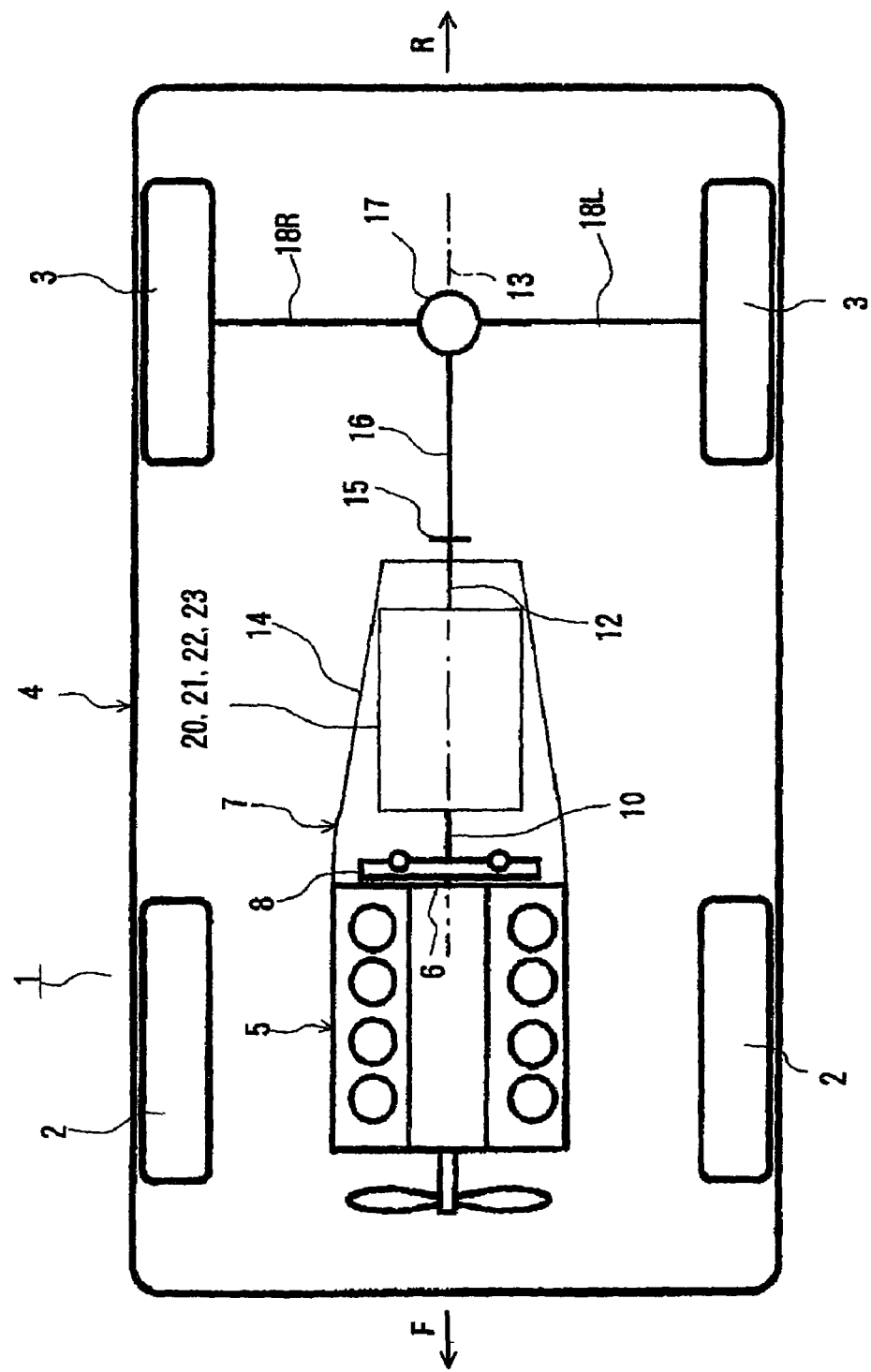
FIG. 1 is a plan view diagrammatically showing an inventive vehicle carrying an inventive hybrid driving unit.

Modes for carrying out the invention will be explained below with reference to the accompanying drawings. It is noted that the same reference numerals cited throughout several views denote the same components or effects and an overlapped explanation thereof will be omitted.

First Embodiment

FIG. 1 shows an exemplary inventive vehicle, i.e., a vehicle 1 carrying an inventive hybrid driving unit. The vehicle 1 shown in the figure is an FR (front-engine and rear-drive) type vehicle and FIG. 1 is a plan view diagrammatically showing the brief structure thereof. It is noted that in an actual vehicle, the direction indicated by an arrow F in the figure denotes the front side and the direction indicated by an arrow R denotes the rear side.

The vehicle 1 in the figure has a body 4 supported by right and left front wheels 2 and by right and left rear wheels 3, i.e., driving wheels. An internal combustion engine 5 is mounted in the front part of the body 4 through an intermediary of a rubber mount not shown in a manner of adjusting a crankshaft 6, i.e., its output shaft, in the longitudinal direction of the body. It is noted that in FIG. 1, the output shaft composed of a rear projection of the crankshaft is shown as the crankshaft 6. A hybrid driving unit 7 is coupled with the rear end of the internal combustion engine 5.

The hybrid driving unit 7 has an input shaft 10 connected to the crankshaft 6 of the internal combustion engine 5 via a damper unit 8, a first electric motor 20, a power splitting planetary gear 21, a transmission 22, a second electric motor 23 (see FIG. 2) and an output shaft 12 for outputting driving force. Here, the input shaft 10 and the output shaft 12 are disposed on one axis 13 such that the input shaft 10 comes on the front side and the output shaft 12, on the rear side. These input and output shafts 10 and 12 are disposed along the longitudinal direction of the body 4 and are stored in a casing member 14 which is lengthy in the longitudinal direction together with the first electric motor 20, the power splitting planetary gear 21, the transmission 22 and the second electric motor 23 described above. It is noted that the hybrid driving unit 7 will be described in detail later.

The output shaft 12 of the hybrid driving unit 7 projects from the rear end of the casing member 14 described above and extends further to the rear to be coupled with a differential unit 17 via a flexible coupling 15 and a publicly known propeller shaft 16 having a universal joint, a center bearing and others not shown. The differential unit 17 is coupled with the right and left rear wheels 3 described above via a left driving shaft 18L and a right driving shaft 18R.

In the vehicle 1 constructed as described above, motive power generated by the internal combustion engine 5 is inputted to the input shaft 10 of the hybrid driving unit 7 and is outputted from the output shaft 12 after being regulated by the first electric motor 20, the power splitting planetary gear 21, the transmission 22 and the second electric motor 23 described later. Then, the motive power thus regulated is transmitted to the right and left rear wheels 3, i.e., the driving wheels, via the propeller shaft 16 and others.

Next, a hybrid driving unit 7A of the present embodiment will be explained as one example of the inventive hybrid driving unit 7 mounted to the vehicle 1 shown in FIG. 1. The outline of the whole hybrid driving unit 7A will be explained at first with reference to the skeleton view in FIG. 2 and then its concrete structure will be detailed with reference to FIG. 3. It is noted that in these figures, the direction indicated by an arrow F denotes the front side of the body (the internal combustion engine side) and the direction indicated by an arrow R denotes the rear side of the body (the differential unit side).

Figure 2:
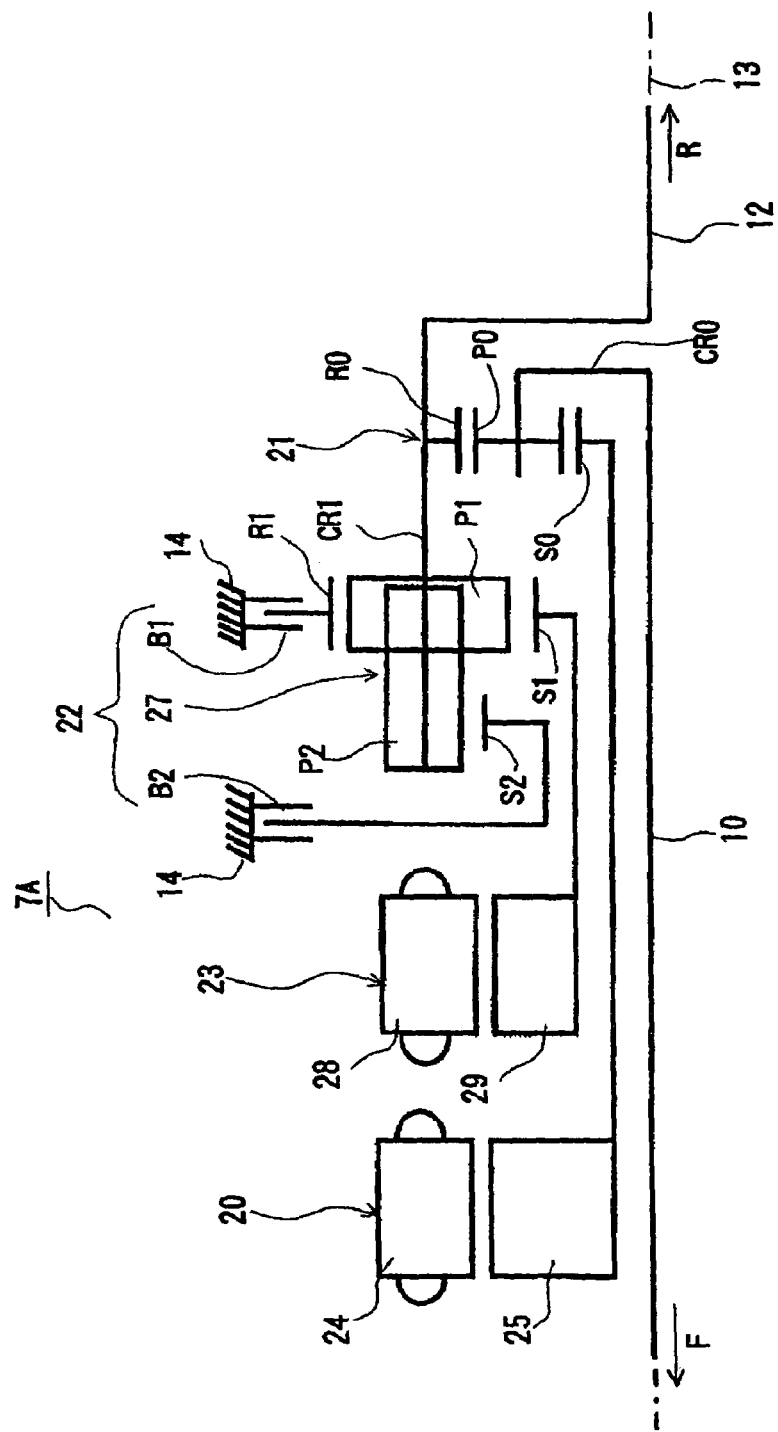
FIG. 2 is a skeleton view showing the hybrid driving unit of a first embodiment.

As shown in FIG. 2, the hybrid driving unit 7A comprises the first electric motor 20, the second electric motor 23, the transmission 22 and the power splitting planetary gear 21 in order from the side closer to the internal combustion engine 5 in FIG. 1, i.e., in order from the front side to the rear side. All of these are stored within the casing member 14 (see FIG. 1) and are disposed in line on (around) the axis 13. These devices will be explained below in the order of the first electric motor 20, the second electric motor 23, the transmission 22 and the power splitting planetary gear 21.

The first electric motor 20 has a stator 24 fixed to the casing member 14 (see FIG. 1) and a rotor 25 rotatably supported on the inner diametric side of the stator 24 (as for the position in the radial direction of the casing member 14, the side closer to the center (the axis 13) will be referred to as the 'inner diametric side' and the side further from the center will be referred to as the 'outer diametric side' in the explanation hereinbelow). The rotor 25 of the first electric motor 20 is coupled with a sun gear S0 of the power splitting planetary gear 21 described later. The first electric motor 20 mainly generates electricity based on the motive power inputted via the sun gear S0 and drives the second electric motor 23 or charges an HV battery (hybrid driving battery) not shown via an inverter not shown.

The second electric motor 23 has a stator 28 fixed to the casing member 14 (see FIG. 1) and a rotor 29 rotatably supported on the inner diametric side of the stator 28. The rotor 29 of the second electric motor 23 is coupled with a sun gear S1 of the transmission 22 described later. Similarly to the first electric motor 20 described above, the second electric motor 23 is connected to the HV battery via the inverter. However, their main functions differ from each other. That is, differing from the first electric motor 20 which is mainly used for the purpose of power generation, the second electric motor 23 functions mainly as a driving motor for assisting the motive power (driving force) of the vehicle 1. However, the second electric motor 23 also functions as a generator when the brake is applied to the vehicle for example by regenerating vehicular inertia force as electrical energy.

The transmission 22 has a so-called Ravigneaux type planetary gear unit 27 comprising one double pinion planetary gear and the single planetary gear that uses one of their pinions in common. The transmission 22 also has first and second brakes B1 and B2.

The planetary gear unit 27 is composed of two sun gears S1 and S2, a carrier CR1 supporting a pinion P1 and a pinion (common long pinion) P2, and a ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12 similarly to the ring gear R0 of the power splitting planetary gear 21 described later. This transmission 22 is arranged so as to be able to change two deceleration stages whose reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1 and the ring gear R0.

The power splitting planetary gear 21 is composed of the single pinion planetary gear disposed coaxially with the input shaft 10. The power splitting planetary gear 21 has a carrier (first rotary element) CR0 supporting a plurality of pinions P0, a sun gear (second rotary element) S0 engaging with the pinion P0 and a ring gear (third rotary element) R0 engaging with the pinion P0. The carrier CR0 of the power splitting planetary gear 21 is coupled with the input shaft 10, the sun gear S0 is coupled with the rotor 25 of the first electric motor 20 and the ring gear R0 is coupled with the output shaft 12. The power splitting planetary gear 21 splits the motive power inputted to the carrier CR0 via the input shaft 10 to the first electric motor 20 via the sun gear S0 and to the output shaft 12 via the ring gear R0 based on the control on the revolution of the first electric motor 20. It is noted that the power split to the first electric motor 20 is used for generating electricity and the power split to the output shaft 12 is used for driving the vehicle 1.

In the hybrid driving unit 7A shown in FIG. 2, the four devices of the first electric motor 20, the second electric motor 23, the transmission 22 and the power splitting planetary gear 21 are all disposed on the input shaft 10. These are coupled each other as follows as shown in the figure.

The input shaft 10 is coupled with the rear side of the carrier (first rotary element) CR0 of the power splitting planetary gear 21 through the inner peripheral side of the first electric motor 20, the second electric motor 23, the transmission 22 and the power splitting planetary gear 21. The output shaft 12 is coupled with the ring gear (third rotary element) R0 of the power splitting planetary gear 21 from the rear side and with the carrier (output element) CR1 of the transmission 22 through the outer peripheral side of the power splitting planetary gear 21. The rotor 25 of the first electric motor 20 is coupled with the sun gear (second rotary element) S0 of the power splitting planetary gear 21 through between the outer peripheral side of the input shaft 10 and the inner peripheral side of the second electric motor 23 and the transmission 22. Then, the rotor 29 of the second electric motor 23 is coupled with the sun gear (input element) S1 through the inner peripheral side of the sun gear S2 of the transmission 22.

Regarding the longitudinal disposition of the first electric motor 20, the second electric motor 23, the transmission 22 and the power splitting planetary gear 21 described above, i.e., the disposition along the axis 13, the first and second electric motors 20 and 23 are disposed adjacently to each other in the present invention. Still more, the first electric motor 20 is disposed on the side closer to the front (the internal combustion engine) than the second electric motor 23 and at the foremost position in the present embodiment.

It is noted that the operation and effect of the hybrid driving unit 7A explained with reference to the skeleton view thereof in FIG. 2 will be explained after detailing the concrete structure of the hybrid driving unit 7A with reference to FIG. 3.

Figure 3:
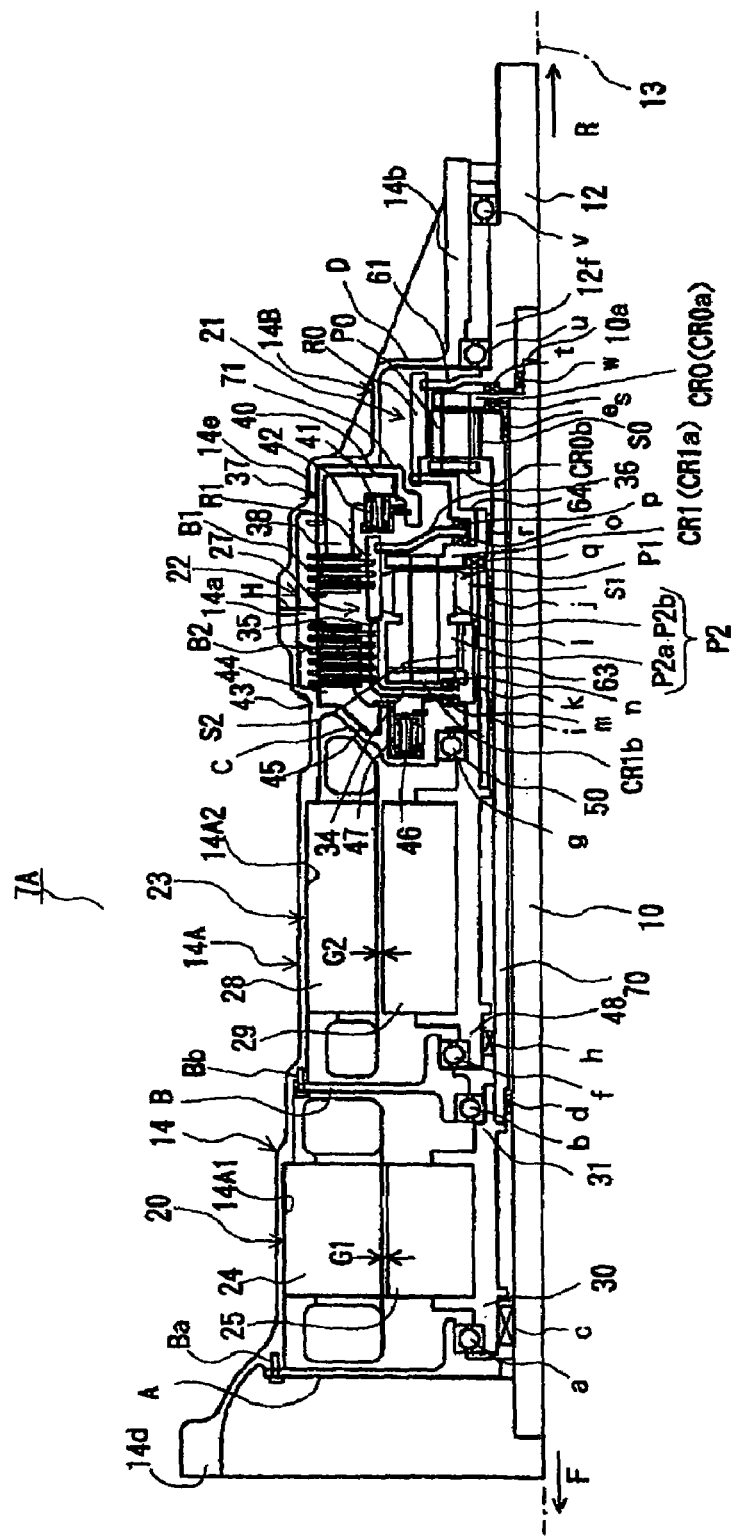
FIG. 3 is a longitudinal section view showing the structure of the hybrid driving unit of the first embodiment.

FIG. 3 shows an upper half portion of the longitudinal section view of the hybrid driving unit 7A including the axis 13.

The hybrid driving unit 7A shown in FIG. 3 comprises the input shaft 10 and the output shaft 12 disposed on the axis 13 and the first electric motor 20, the second electric motor 23, the transmission 22 and the power splitting planetary gear 21 disposed around the axis 13. All of these devices are stored within the casing member 14, except of a part of the rear end of the output shaft 12 projecting out of the casing member 14 to the rear.

Taking the readiness of assembly and others into account, the casing member 14 is built in a body by connecting joints of a plurality of partial cases divided in the longitudinal direction along the axis 13. In the present embodiment shown in FIG. 3, the front partial case 14A is connected in a body with the rear partial case 14B at the joint H to form the casing member 14. Note that the joints H is located in the vicinity between the second brake B2 and the first brake B1 of the transmission 22. In the casing member 14, a plurality of partitions, i.e., partitions A, B, C and D, are formed at different positions in the longitudinal direction in order from the front side. Among these partitions A through D, the partitions A and D are disposed near the front and rear ends of the casing member 14, respectively, and the space within the case between the partitions A and D is divided into three spaces by the partitions B and C longitudinally along the axis 13. These partitions A through D act as reinforcing members of the casing member 14 and are used for retaining bearings a through w described later and for forming hydraulic chambers 40 and 45 described later. Among the partitions A through D, the partitions A and B are formed by disc-like partition members, i.e., separate members, fixed to the positions shown in the figure by fastening a plurality of bolts Ba and Bb (one each is shown in the figure) in the vicinity of the edge thereof. Still more, the radial size of the motor storage section 14A1 on the front side of the partition B in the partial case 14A is set to be larger than that of the motor storage section 14A2 on the rear side. It improves the mountability of the hybrid driving unit 7A in mounting to the FR-type vehicle 1.

The first electric motor 20, the second electric motor 23, the transmission 22 and the power splitting planetary gear 21 are stored within the three spaces divided by the partitions A through D, respectively. That is, the first electric motor 20 is stored in the space between the partitions A and B, the second electric motor 23 is stored between the partitions B and C, and the transmission 22 and the power splitting planetary gear 21 are stored between the partitions C and D, respectively. Beginning from the first electric motor 20, these devices will be detailed in order below.

The first electric motor 20 comprises an AC permanent magnet synchronous motor (brushless DC motor) for example. It is stored between the partitions A and B and is disposed on the outer diametric side of the input shaft 10 coaxially therewith. The first electric motor 20 has the stator 24 fixed to the inner peripheral face of the casing member 14 and the rotor 25 rotatably disposed on the inner diametric side of the stator 24 apart from the stator 24 by a predetermined air gap G1. The inner diametric side of the rotor 25 is formed into a cylindrical shape and stages 30 and 31 are formed at the front and rear outer peripheral faces of the cylindrical part. The casing member 14 rotatably supports the rotor 25 through an intermediary of bearings a and b fitted between these stages 30 and 31 and the partitions A and B while being positioned in the longitudinal direction. A sleeve 70 extending to the rear is fitted around the outer peripheral face of the input shaft 10 at the rear end of the cylindrical part. The edge of the sleeve 70 is coupled with the rear end of the rotor 25 and the rear end thereof is coupled with the sun gear S0 of the power splitting planetary gear 21 through the inside of the second electric motor 23 and the transmission 22 described later. The cylindrical part of the rotor 25, the sleeve 70 and the sun gear S0 are formed in a body and are relatively and rotatably supported by the input shaft 10 through the intermediary of bearings c, d and e fixed to the outer peripheral face of the input shaft 10. It is noted as for the longitudinal disposition that the bearings c and d are disposed at the positions corresponding to the bearings a and b. The casing member 14 rotatably supports the input shaft 10 through the intermediary of the bearing c between the input shaft 10 and the rotor 25 provided at the position axially overlapping with the bearing a and of the bearing a supporting the rotor 25 at the front end thereof and through the intermediary of the bearing w, provided between the input shaft 10 and a hollow cylindrical section 12f at the front end of the output shaft 12, and of the output shaft 12 rotatably supported by a boss portion 14b of the casing member 14 through the intermediary of bearings u and v. Because the rotor 25 of the first electric motor 20 is rotatably supported by the casing member 14 and the input shaft 10 through the intermediary of the bearings a and b fixed to the partitions A and B as described above, the position of the rotor 25 in the longitudinal and radial directions may be assured accurately. Accordingly, even if a force bending the casing member 14 in the vertical or horizontal direction acts on the casing member 14, the predetermined air gap G1 between the stator 24 and the rotor 25 may be kept accurately. It is noted that the first electric motor 20 is connected to the HV battery via the inverter as described above. The main function of the first electric motor 20 constructed as described above is to generate electricity and to charge the HV battery via the inverter based on the power split to the sun gear S0 of the power splitting planetary gear 21 described later.

The second electric motor 23 comprises an AC permanent magnet synchronous motor (brushless DC motor) for example and is disposed on the outer diametric side of the input shaft 10 coaxially therewith. The second electric motor 23 has the stator 28 fixed to the inner peripheral face of the casing member 14 and the rotor 29 rotatably disposed on the inner diametric side of the stator 28 apart from the stator 28 by a predetermined air gap G2. The inner diametric side of the rotor 29 is formed into a cylindrical shape and stages 48 and 50 are formed, respectively, at the front and rear outer peripheral faces of the cylindrical part. The casing member 14 rotatably supports the rotor 29 through an intermediary of bearings f and g fitted between the stages 48 and 50 and the partitions B and C while being positioned in the longitudinal direction. The rear end of the cylindrical part is coupled with the sun gear S1 of the transmission 22 described later via a sleeve 63 fitted around the outer peripheral face of the sleeve 70 formed in a body with the rotor 25 described above. The cylindrical part of the rotor 29, the sleeve 63 and the sun gear S1 mutually formed in a body are relatively rotatably supported by the sleeve 70 through an intermediary of bearings h, i and j fixed on the outer peripheral face of the sleeve 70. It is noted that the bearings h and j are disposed at the positions corresponding to the bearings f and g in terms of the disposition in the longitudinal direction. Since the rotor 29 of the second electric motor 23 is rotatably supported by the casing member 14 through the intermediary of the bearings f and g fixed to the partitions B and C as described above, the longitudinal and radial positions of the rotor 29 may be maintained accurately. Accordingly, even if a force that may bend the casing member 14 in the vertical or lateral direction acts thereon, the predetermined air gap G2 between the stator 28 and the rotor 29 may be kept accurately. It is noted that the second electric motor 23 is connected to the HV battery via the inverter similarly to the first electric motor 20 described above.

The transmission 22 is disposed on the front side in the space between the partitions C and D of the casing member 14. The transmission 22 has the Ravigneaux type planetary gear unit 27 disposed on the inner diametric side and first and second brakes B1 and B2 disposed, respectively, on the rear and front sides on the outer diametric side.

The planetary gear unit 27 has a first sun gear S1 (hereinafter simply referred to as 'the sun gear S1'), a second sun gear S2 (hereinafter simply referred to as 'the sun gear S2') disposed on the front side of the sun gear S1 and slightly on the outer diametric side, the ring gear R1 disposed on the outer diametric side of the sun gear S1, the pinion P1 engaging with the sun gear S1 and the ring gear R1, the pinion P2 composing the common long pinion and engaging with the sun gear S2 and the pinion P1, and the carrier CR1 supporting these pinions P1 and P2. Beginning from the sun gear S1, these parts will be explained below.

The sun gear S1 is coupled with the rear end of the rotor 29 of the second electric motor 23 described above via the sleeve 63 described above. This sun gear S1 is relatively and rotatably supported together with the sleeve 63 as described above by the sleeve 70 through an intermediary of the bearings i and j fitted to the outer peripheral face of the input shaft 10.

The sun gear S2 is formed in a body with a flange portion 34 extending from the front end of the sun gear S2 to the outer diametric side along the front carrier plate CR1b of the carrier CR1 and with a drum portion 35 extending to the rear from the outer diametric end of the flange portion 34. The second brake B2 described later is interposed between the outer peripheral face of this drum portion 35 and an inner peripheral spline 14a of the inner peripheral face of the casing member 14. The sun gear S2 is rotatably supported by bearings k and l fitted to the outer peripheral face of the sleeve 63 formed in a body with the sun gear S1 described above and bearings m and n fitted, respectively, to the front and rear faces on the inner diametric side (basal end side) of the flange portion 34. It is noted that the bearing m is interposed between the flange portion 34 and the inner diametric rear face of the partition C and the bearing n is interposed between the flange portion 34 and the inner diametric front face of the front carrier plate CR1b of the carrier CR1.

The ring gear R1 is provided with a flange portion 36 fixed at the rear end thereof and extending to the inner diametric side along the rear carrier plate CR1a of the carrier CR1 and is rotatably supported by bearings o and p fitted to the front and rear faces on the inner diametric side of the flange portion 36. The bearing o is interposed between the flange portion 36 and the rear carrier plate CR1a of the carrier CR1 and the bearing p is interposed between the flange portion 36 and a coupling member 64 described later. The first brake B1 is interposed between the outer peripheral face of the ring gear R1 and the inner peripheral spline 14a of the inner peripheral face of the casing member 14.

The pinion P1 is rotatably supported by the carrier CR1 and is engaged with the sun gear S1 described above on the inner diametric side and with the ring gear R1 described above on the outer diametric side.

The pinion P2 is the common long pinion in which a large-diametric gear P2a formed on the rear side and a small-diametric gear P2b formed on the front side are combined in a body. In the pinion P2, the large-diametric gear P2a is engaged with the sun gear S2 described above and the small-diametric gear P2b is engaged with the pinion P1 described above.

The carrier CR1 rotatably supports the pinions P1 and P2 by the front and rear carrier plates CR1b and CR1a. The rear carrier plate CR1a is coupled with the ring gear R0 of the power splitting planetary gear 21 described later through the coupling member 64. The coupling member 64 is connected to the inner diametric rear end of the rear carrier plate CR1a of the carrier CR1. It extends at the front end thereof slightly to the outer diametric side to retain a bearing p, bends and extends to the rear and extends to the outer diametric side to be coupled with the front end of the ring gear R0. The rear carrier plate CR1a is rotatably supported by the bearing q fitted between the inner diametric front face and the rear face of the sun gear S1 and the bearing r fitted between the carrier CR1 and the outer peripheral face of the sleeve 70 described above.

The first brake B1 has a number of discs and friction plates (brake plates) and is spline-coupled between an outer peripheral spline formed on the outer peripheral face of the ring gear R1 described above and the inner peripheral spline 14a formed on the inner peripheral face of the casing member 14. A hydraulic actuator 37 for the first brake is disposed on the rear side of the first brake B1. The hydraulic actuator 37 has a piston 38 disposed on the rear side of the first brake B1 so as to be movable in the longitudinal direction, a first hydraulic chamber 40 which is provided in a cylinder member 71 fixed to the inner peripheral face and the front face of a stepped portion 14e of the casing member 14 and into which the rear end of the piston 38 is oil-tightly fitted, and a return spring (compression spring) 42 interposed between a retainer 41 fixed to the cylinder member 71 and the inner diametric front face of the piston 38 to bias the piston 38 to the rear.

The second brake B2 is disposed just before the first brake B1 described above. The second brake B2 has a number of discs and friction plates (brake plates) and is spline-coupled between an outer peripheral spline formed on the outer peripheral face of the drum portion 35 combined with the sun gear S2 described above and the inner spline 14a formed on the inner peripheral face of the casing member 14. A hydraulic actuator 43 for the second brake is disposed on the front side of the second brake B2. The hydraulic actuator 43 has a piston 44 disposed before the second brake B2 so as to be movable in the longitudinal direction, a second hydraulic chamber 45 which is provided at the outer diametric rear face of the partition C and into which the front end of the piston 44 is oil-tightly fitted, and a return spring (compression spring) 47 interposed between a retainer 46 fixed to the casing member 14 and the inner diametric rear face of the piston 44 to bias the piston 44 to the front.

In the transmission 22 constructed as described above, an output from the second electric motor 23 is transmitted to the sun gear S1 via the sleeve 63. In a low state, the first brake B1 is engaged and the second brake B2 is released. Accordingly, the ring gear R1 is locked and the sun gear S2 is freely rotatable in this state. The revolution of the first sun gear S1 described above is largely reduced via the pinion P1 and is transmitted to the carrier CR1. The revolution of the carrier CR1 is then transmitted to the output shaft 12.

When the transmission 22 is in a high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolution and the revolution of the carrier CR1 reduced relatively in small is transmitted to the output shaft 12 at this time.

Thus, the transmission 22 transmits the largely reduced revolution to the output shaft 12 in the low state by engaging the first brake B1 and by releasing the second brake B2, respectively. In contrary, it transmits the revolution reduced relatively in small to the output shaft 12 by releasing the first brake B1 and by engaging the second brake B2, respectively. Because the transmission 22 is thus capable of shifting in the two stages, the second electric motor 23 may be downsized. That is, the transmission 22 enables to use a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

The power splitting planetary gear 21 is disposed in the rear half of the space between the partitions C and D of the casing member 14, i.e., on the rear side of the transmission 22 described above. The power splitting planetary gear 21 is composed of the single pinion planetary gear disposed coaxially with the input shaft 10 as described above and has the ring gear (third rotary element) R0, the sun gear (second rotary element) S0 and the carrier (first rotary element) CR0 supporting the pinions P0. Among them, the front end of the ring gear R0 is coupled with the coupling member 64 described above and the rear end thereof extends to the rear and is fixed to the outer diametric end of a flange portion 61 extending to the outer diametric side from the outer peripheral face near the front end of the output shaft 12 along the rear carrier plate CR0a. The rear carrier plate CR0a of the carrier CR0 is coupled with the rear end of the input shaft 10. The sun gear S0 is coupled with the rear end of the rotor 25 of the first electric motor 20 via the sleeve 70 described above. In the power splitting planetary gear 21, the sun gear S0 is rotatably supported by a bearing e fitted between the input shaft 10 and the outer peripheral face of the rear end of the input shaft 10 and the carrier CR0 is rotatably supported by a bearing s fitted between the inner diametric front face of the rear carrier plate CR0a and the rear end face of the sun gear S0 and a bearing t fitted between the inner diametric rear face and the rear end face of the output shaft 12. Thus, in the power splitting planetary gear 21, the carrier CR0, which is the input section, is fixed to the input shaft 10 and the sun gear S0 and the ring gear R0, which are the output sections (to which power is split), are coupled with the rear end of the rotor 25 of the first electric motor 20 and with the front end of the output shaft 12, respectively. That is, the power splitting planetary gear 21 is arranged so as to split the power of the internal combustion engine 5 inputted to the carrier CR0 via the input shaft 10 (see FIG. 1) to the side of the first electric motor 20 via the sun gear S0 and to the side of the output shaft 12 via the ring gear R0. The ratio of split of power at this time is decided based on the state of revolution of the first electric motor 20. That is, when the rotor 25 of the first electric motor 20 is caused to generate a large power, an amount of power generated by the first electric motor 20 increases and the power outputted to the output shaft 12 is reduced to that extent. When the rotor 25 of the first electric motor 20 is caused to generate a small power in contrary, an amount of power generated by the first electric motor 20 decreases and the power outputted to the output shaft 12 increases to that extent.

The casing member 14 storing the first electric motor 20, the second electric motor 23, the transmission 22 and the power splitting planetary gear 21 as described above has a cylindrical section 14b which extends to the rear on the inner diametric side of the partition D at the rear end thereof. The casing member 14 rotatably supports the output shaft 12 by the cylindrical section 14b through an intermediary of bearings u and v. The front end of the output shaft 12 is formed as a hollow cylindrical portion 12f into which a boss portion 10a projecting from the rear end of the input shaft 10 is inserted. Then, a bearing w, which corresponds to the bearing u, is fitted between the inner peripheral face of the hollow cylindrical portion 12f and the outer peripheral face of the boss portion 10a. The input shaft 10 is rotatably supported by the output shaft 12 at the rear end thereof through the intermediary of the bearing w.

A coupling section 14d at the front end of the casing member 14 is connected with the internal combustion engine 5 rubber-mounted to the body 4 (see FIG. 1) and the rear end thereof is rubber-mounted to a part of the body by utilizing a mounting section not shown.

In the hybrid driving unit 7A constructed as described above, the motive power inputted to the input shaft 10 is inputted to the carrier CR0 of the power splitting planetary gear 21 to be split (divided) to the sun gear S0 and the ring gear R0 as shown in the skeleton view of FIG. 2. Among them, the motive power split to the sun gear S0 is inputted to the rotor 25 of the first electric motor 20 to be used to generate electricity. The electricity thus generated is charged to the HV battery via the inverter. The second electric motor 23 receives the electricity supplied from the HV battery via the inverter and drives the output shaft 12 via the transmission 22 and the ring gear R0. That is, the motive power from the internal combustion engine 5 is combined with the power from the second electric motor 23 and is outputted to the output shaft 12. It is noted that because the transmission 22 is arranged so as to be capable of switching between the high and low states as described above, power corresponding to the high or low state is outputted to the output shaft 12.

Since the first electric motor 20 and the second electric motor 23 are disposed adjacently to each other on the axis 13 as shown in FIG. 3 in the present embodiment, the parts of the case storing these first and second electric motors 20 and 23 may be combined, thus facilitating the accommodation in producing the unit in series. It also brings about such effects that a number of parts and, hence the cost, may be reduced, the accuracy for supporting the two electric motors 20 and 23 may be improved, the length of power cables of the two electric motors 20 and 23 maybe almost equalized regardless of the position of a controller for controlling them, the length of the cable may be minimized when the inverter is disposed within an engine room on the front side of the vehicle, thus minimizing the loss of electricity, and others.

Next, a first modification (corresponding to the tenth aspect of the invention) of the hybrid driving unit 7A of the present embodiment will be explained with reference to a skeleton view in FIG. 4.

Figure 4:
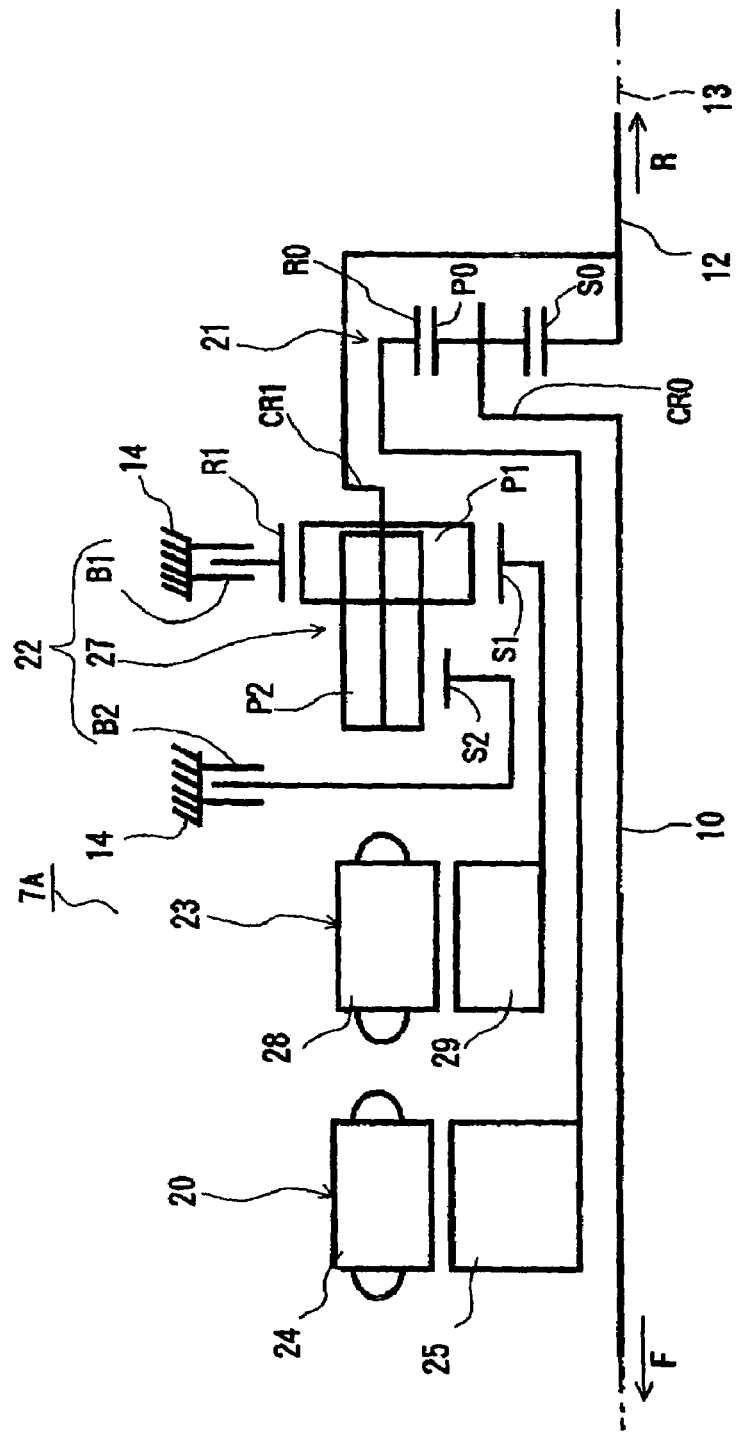
FIG. 4 is a skeleton view showing a first modification of the hybrid driving unit of the first embodiment.

As shown in FIG. 4, the hybrid driving unit 7A comprises the first electric motor 20, the second electric motor 23, the transmission 22 and the power splitting planetary gear 21 in order from the side closer to the internal combustion engine 5 in FIG. 1, i.e., in order from the front to the rear. All of these are stored within the casing member 14 (see FIG. 1) and are disposed in line around the axis 13 in order from the front. These devices will be explained below in the order of the first electric motor 20, the second electric motor 23, the transmission 22 and the power splitting planetary gear 21.

The first electric motor 20 has the stator 24 fixed to the casing member 14 (see FIG. 1) and the rotor 25 rotatably supported on the inner diametric side of the stator 24. The rotor 25 of the first electric motor 20 is coupled with a ring gear R0 of the power splitting planetary gear 21 described later. The first electric motor 20 generates electricity based on the motive power inputted via the ring gear R0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described later. Similarly to the first electric motor 20 described above, the second electric motor 23 is connected to the HV battery via the inverter. The second electric motor 23 functions mainly as a driving motor for assisting the motive power of the vehicle 1. However, the second electric motor 23 also functions as a generator when the brake is applied to the vehicle for example by regenerating vehicular inertia force as electrical energy.

The transmission 22 has the so-called Ravigneaux type planetary gear unit 27 comprising one double pinion planetary gear and the single planetary gear that uses one of their pinions in common. The transmission 22 also has the first and second brakes B1 and B2.

The planetary gear unit 27 is composed of two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

The power splitting planetary gear 21 is composed of the single pinion planetary gear disposed coaxially with the output shaft 12. The power splitting planetary gear 21 has the carrier (first rotary element) CR0 supporting a plurality of pinions P0, the sun gear (third rotary element) S0 engaging with the pinion P0 and the ring gear (second rotary element) R0 engaging with the pinion P0. The carrier CR0 of the power splitting planetary gear 21 is coupled with the input shaft 10, the ring gear R0 is coupled with the rotor 25 of the first electric motor 20 and the sun gear S0 is coupled with the output shaft 12. The power splitting planetary gear 21 constructed as described above splits the motive power inputted to the carrier CR0 via the input shaft 10 to the first electric motor 20 via the ring gear R0 and to the output shaft 12 via the sun gear S0 based on the control on the revolution of the first electric motor 20. It is noted that the power split to the first electric motor 20 is used for generating electricity and the power split to the output shaft 12 is used for driving the vehicle 1.

In the hybrid driving unit 7A shown in FIG. 4, among the four devices of the first electric motor 20, the second electric motor 23, the transmission 22 and the power splitting planetary gear 21, the former three devices are disposed on the input shaft 10 and the remaining power splitting planetary gear 21 is disposed on the output shaft 12. These are coupled each other as follows as shown in the figure.

The input shaft 10 is coupled with the front side (the transmission 22 side) of the carrier (first rotary element) CR0 of the power splitting planetary gear 21 through the inner peripheral side of the first electric motor 20, the second electric motor 23 and the transmission 22. The output shaft 12 is coupled with the sun gear (third rotary element) S0 of the power splitting planetary gear 21 from the rear side and with the carrier (output element) CR1 of the transmission 22 through the outer peripheral side of the power splitting planetary gear 21. The rotor 25 of the first electric motor 20 is coupled with the ring gear (second rotary element) R0 of the power splitting planetary gear 21 through between the outer peripheral side of the input shaft 10 and the inner peripheral side of the second electric motor 23 and the transmission 22. Then, the rotor 29 of the second electric motor 23 is coupled with the sun gear (input element) S1 through the inner peripheral side of the sun gear S2 of the transmission 22.

Next, a second modification (corresponding to the eleventh aspect of the invention) of the hybrid driving unit 7A of the present embodiment will be explained with reference to a skeleton view in FIG. 5.

Figure 5:
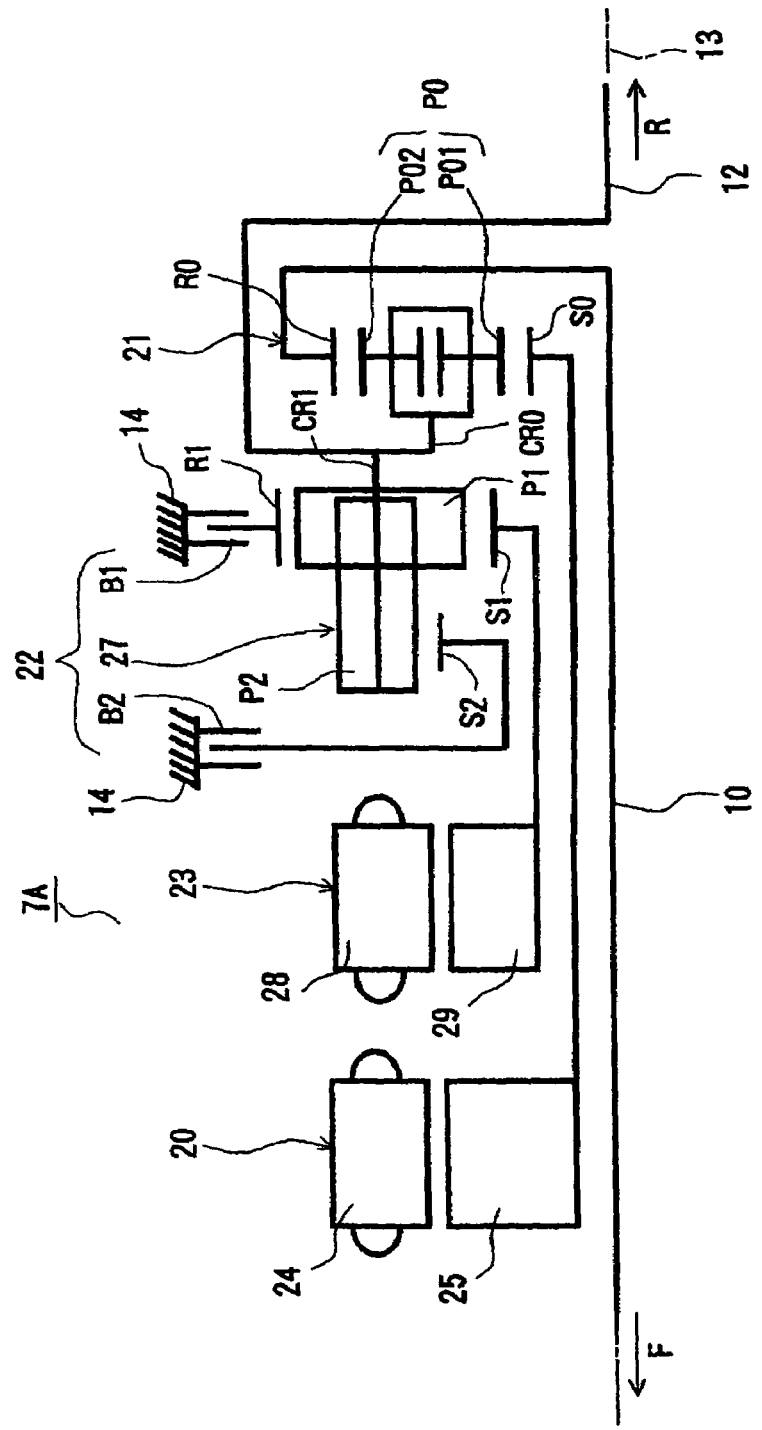
FIG. 5 is a skeleton view showing a second modification of the hybrid driving unit of the first embodiment.

As shown in FIG. 5, the hybrid driving unit 7A comprises the first electric motor 20, the second electric motor 23, the transmission 22 and the power splitting planetary gear 21 in order from the side closer to the internal combustion engine 5 in FIG. 1, i.e., in order from the front to the rear. All of these are stored within the casing member 14 (see FIG. 1) and are disposed in line around the axis 13 in order from the front along the axis 13. These devices will be explained below in the order of the first electric motor 20, the second electric motor 23, the transmission 22 and the power splitting planetary gear 21.

The first electric motor 20 has the stator 24 fixed to the casing member 14 (see FIG. 1) and the rotor 25 rotatably supported on the inner diametric side of the stator 24. The rotor 25 of the first electric motor 20 is coupled with a sun gear S0 of the power splitting planetary gear 21 described later. The first electric motor 20 arranged as described above mainly generates electricity based on the motive power inputted via the sun gear S0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described later. Similarly to the first electric motor 20 described above, the second electric motor 23 is connected to the HV battery via the inverter. The second electric motor 23 functions mainly as a driving motor for assisting the motive power (driving force) of the vehicle 1. However, the second electric motor 23 also functions as a generator when the brake is applied to the vehicle for example by regenerating vehicular inertia force as electrical energy.

The transmission 22 has the so-called Ravigneaux type planetary gear unit 27 comprising one double pinion planetary gear and the single planetary gear that uses one of their pinions in common. The transmission 22 also has the first and second brakes B1 and B2.

The planetary gear unit 27 is composed of the two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other as described later. That is, the transmission 22 is arranged so as to change the degree of the motive power inputted from the second electric motor 23 described above via the sun gear S1 and to transmit it to the output shaft 12 via the carrier CR1.

The power splitting planetary gear 21 is composed of the double pinion planetary gear disposed coaxially with the input shaft 10. The power splitting planetary gear 21 has the carrier (third rotary element) CR0 supporting the plurality of pinions P0 (P01 and P02), the sun gear (second rotary element) S0 engaging with the pinion P01 and the ring gear (first rotary element) R0 engaging with the pinion P02. The ring gear R0 of the power splitting planetary gear 21 is coupled with the input shaft 10, the sun gear S0 is coupled with the rotor 25 of the first electric motor 20 and the carrier CR0 is coupled with the output shaft 12. The power splitting planetary gear 21 splits the motive power inputted to the ring gear R0 via the input shaft 10 to the first electric motor 20 via the sun gear S0 and to the output shaft 12 via the carrier CR0 based on the control on the revolution of the first electric motor 20. It is noted that the power split to the first electric motor 20 is used for generating electricity and the power split to the output shaft 12 is used for driving the vehicle 1.

In the hybrid driving unit 7A shown in FIG. 5, all of the four devices of the first electric motor 20, the second electric motor 23, the transmission 22 and the power splitting planetary gear 21 are disposed on the input shaft 10. These are coupled each other as follows as shown in the figure.

The input shaft 10 is coupled with the ring gear (first rotary element) R0 of the power splitting planetary gear 21 through the inner peripheral side of the first electric motor 20, the second electric motor 23, the transmission 22 and the power splitting planetary gear 21 and behind the power splitting planetary gear 21. The output shaft 12 is coupled with the front side (the transmission 22 side) of the carrier (third rotary element) CR0 of the power splitting planetary gear 21 through the outer peripheral side of the power splitting planetary gear 21 and with the carrier (output element) CR1 of the transmission 22. The rotor 25 of the first electric motor 20 is coupled with the sun gear (second rotary element) S0 of the power splitting planetary gear 21 through between the outer peripheral side of the input shaft 10 and the inner peripheral side of the second electric motor 23 and the transmission 22. Then, the rotor 29 of the second electric motor 23 is coupled with the sun gear (input element) S1 through the inner peripheral side of the sun gear S2 of the transmission 22.

Next, a third modification (corresponding to the twelfth aspect of the invention) of the hybrid driving unit 7A of the present embodiment will be explained with reference to a skeleton view in FIG. 6.

Figure 6:
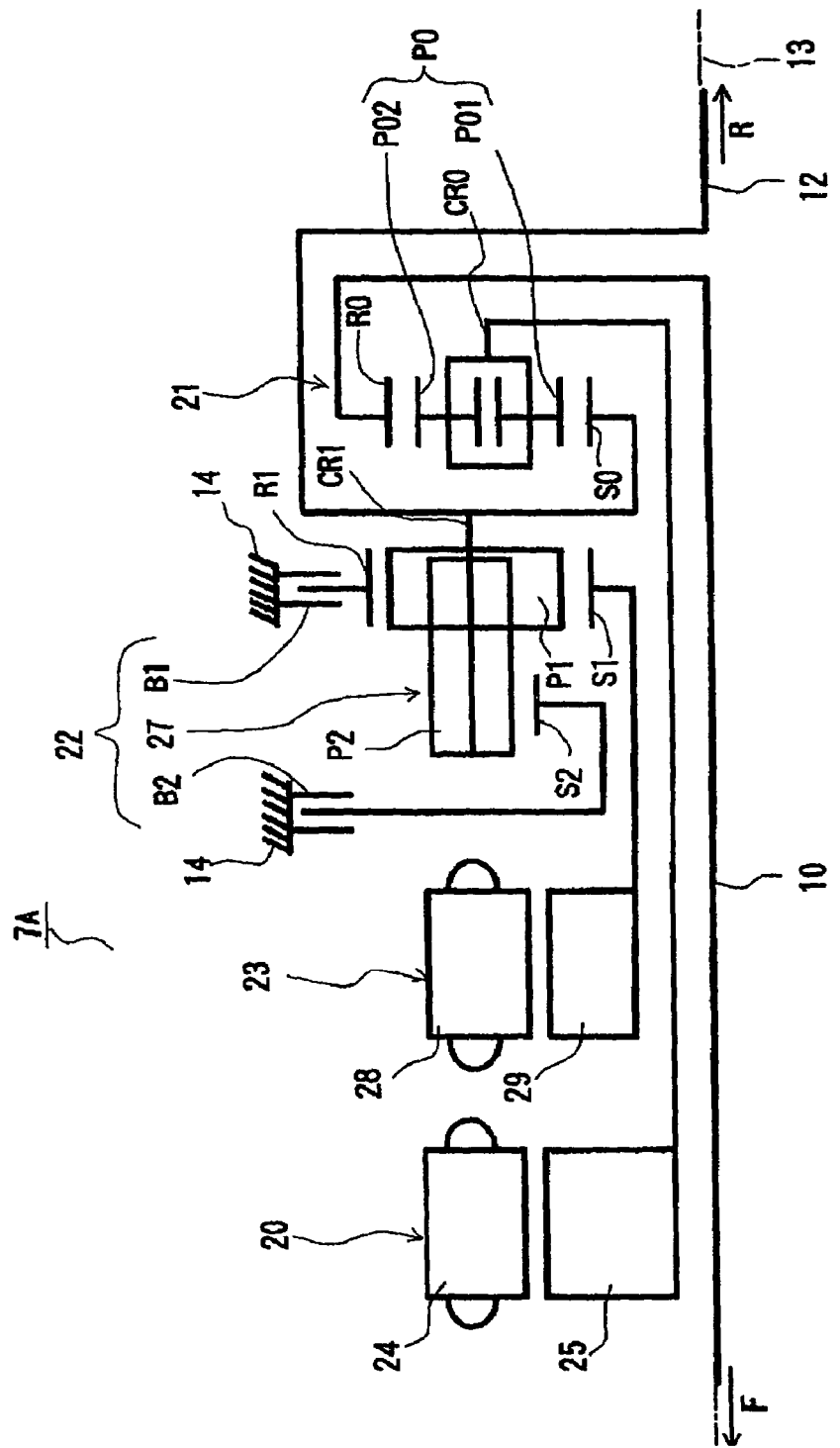
FIG. 6 is a skeleton view showing a third modification of the hybrid driving unit of the first embodiment.

As shown in FIG. 6, the hybrid driving unit 7A comprises the first electric motor 20, the second electric motor 23, the transmission 22 and the power splitting planetary gear 21 in order from the side closer to the internal combustion engine 5 in FIG. 1, i.e., in order from the front to the rear. All of these are stored within the casing member 14 (see FIG. 1) and are disposed in line around the axis 13 in order from the front along the axis 13. These devices will be explained below in the order of the first electric motor 20, the second electric motor 23, the transmission 22 and the power splitting planetary gear 21.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the carrier CR0 of the power splitting planetary gear 21 described later. The first electric motor 20 mainly generates electricity based on the motive power inputted via the carrier CR0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described later. Similarly to the first electric motor 20 described above, the second electric motor 23 is connected to the HV battery via the inverter. The second electric motor 23 mainly functions as a driving motor for assisting the motive power (driving force) of the vehicle 1. However, the second electric motor 23 also functions as a generator when the brake is applied to the vehicle for example by regenerating vehicular inertia force as electrical energy.

The transmission 22 has the so-called Ravigneaux type planetary gear unit 27 comprising one double pinion planetary gear and the single planetary gear that uses one of their pinions in common. The transmission 22 also has the first and second brakes B1 and B2.

The planetary gear unit 27 is composed of two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other as described later. That is, the transmission 22 is arranged so as to change the degree of the motive power inputted from the second electric motor 23 described above via the carrier CR1 and to transmit it to the output shaft 12 via the carrier CR1.

The power splitting planetary gear 21 is composed of the double pinion planetary gear disposed coaxially with the input shaft 10. The power splitting planetary gear 21 has the carrier (second rotary element) CR0 supporting the plurality of pinions P0 (P01 and P02), the sun gear (third rotary element) S0 engaging with the pinion P1 and the ring gear (first rotary element) R0 engaging with the pinion P02. The ring gear R0 of the power splitting planetary gear 21 is coupled with the input shaft 10, the carrier CR0 is coupled with the rotor 25 of the first electric motor 20 and the sun gear S0 is coupled with the output shaft 12. The power splitting planetary gear 21 described above splits the motive power inputted to the ring gear R0 via the input shaft 10 to the first electric motor 20 via the carrier CR0 and to the output shaft 12 via the sun gear S0 based on the control on the revolution of the first electric motor 20. It is noted that the power split to the first electric motor 20 is used for generating electricity and the power split to the output shaft 12 is used for driving the vehicle 1.

In the hybrid driving unit 7A shown in FIG. 6, all of the four devices of the first electric motor 20, the second electric motor 23, the transmission 22 and the power splitting planetary gear 21 are disposed on the input shaft 10. These are coupled each other as follows as shown in the figure.

The input shaft 10 is coupled with the ring gear (first rotary element) R0 of the power splitting planetary gear 21 through the inner peripheral side of the first electric motor 20, the second electric motor 23, the transmission 22 and the power splitting planetary gear 21 and behind the power splitting planetary gear 21. The output shaft 12 is coupled with the sung gear (third rotary element) S0 of the power splitting planetary gear 21 through the outer peripheral side of the power splitting planetary gear 21 and between the power splitting planetary gear 21 and the transmission 22 and with the carrier (output element) CR1 of the transmission 22. The rotor 25 of the first electric motor 20 is coupled with the rear side of the carrier (second rotary element) CR0 of the power splitting planetary gear 21 through between the outer peripheral side of the input shaft 10 and the inner peripheral side of the second electric motor 23, the transmission 22 and the power splitting planetary gear 21. Then, the rotor 29 of the second electric motor 23 is coupled with the sun gear (input element) S1 through the inner peripheral side of the sun gear S2 of the transmission 22.

Second Embodiment

Next, a hybrid driving unit 7B of a second embodiment will be explained as another example of the inventive hybrid driving unit 7 mounted to the vehicle 1 shown in FIG. 1. The outline of the whole hybrid driving unit 7B will be explained at first with reference to the skeleton view in FIG. 7 and then its concrete structure will be detailed with reference to FIG. 8. It is noted that in these figures, the direction indicated by an arrow F denotes the front side of the body (the internal combustion engine side) and the direction indicated by an arrow R denotes the rear side thereof (the differential unit side).

Figure 7:
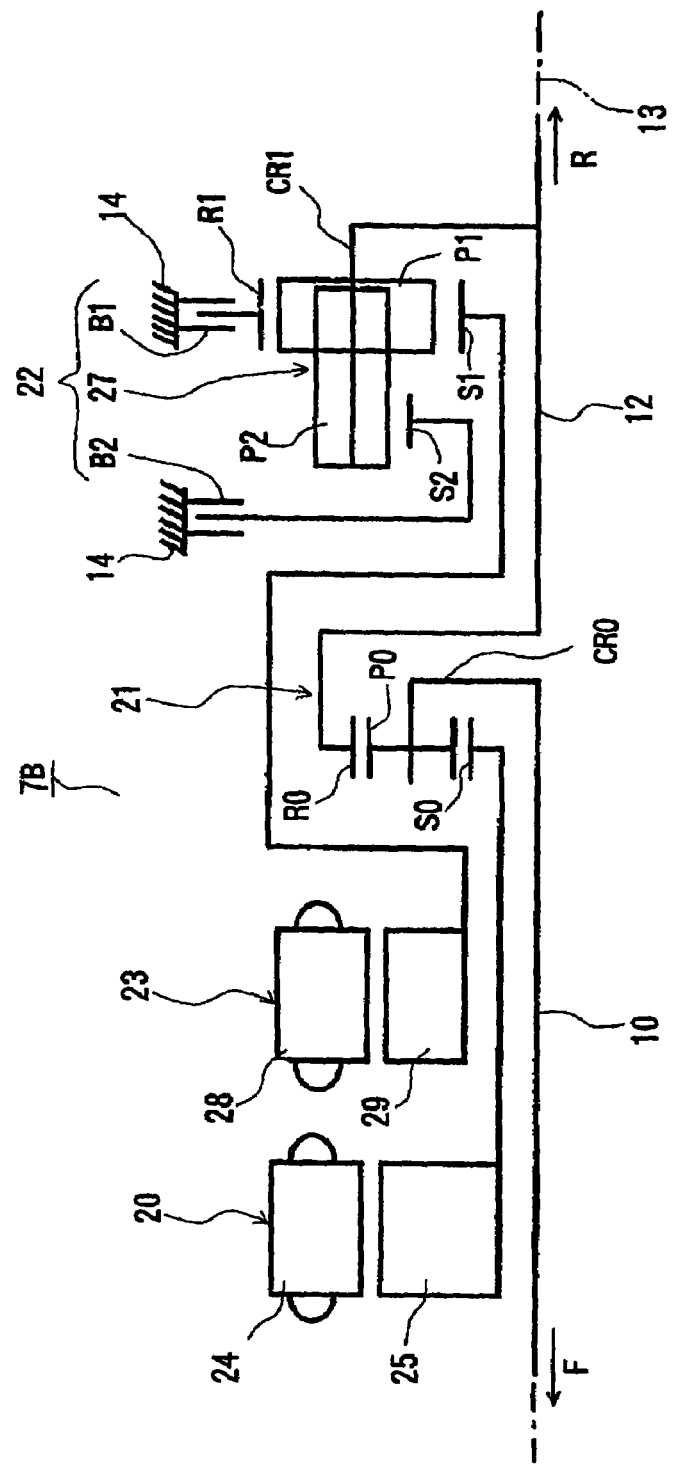
FIG. 7 is a skeleton view showing a hybrid driving unit of a second embodiment.

As shown in FIG. 7, the hybrid driving unit 7B comprises the first electric motor 20, the second electric motor 23, the power splitting planetary gear 21 and the transmission 22 in order from the side closer to the internal combustion engine 5 in FIG. 1, i.e., in order from the front to the rear. All of these are stored within the casing member 14 (see FIG. 1) and are disposed in line around the axis 13 in order along the axis 13. These devices will be explained below in the order of the first electric motor 20, the second electric motor 23, the power splitting planetary gear 21 and the transmission 22.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the sun gear S0 of the power splitting planetary gear 21 described later. The first electric motor 20 constructed as described above mainly generates electricity based on the motive power inputted via the sun gear S0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with a sun gear S1 of the transmission 22 described later. Similarly to the first electric motor 20 described above, the second electric motor 23 is connected to the HV battery via the inverter. However, their main functions differ from each other. That is, differing from the first electric motor 20 which is mainly used for generating electricity, the second electric motor 23 functions mainly as a driving motor for assisting the motive power (driving force) of the vehicle 1. However, the second electric motor 23 also functions as a generator when the brake is applied to the vehicle for example by regenerating vehicular inertia force as electrical energy.

The power splitting planetary gear 21 is composed of the single pinion planetary gear disposed coaxially with the input shaft 10. The power splitting planetary gear 21 has the carrier (first rotary element) CR0 supporting a plurality of pinions P0, the sun gear (second rotary element) S0 engaging with the pinion P0 and the ring gear (third rotary element) R0 engaging with the pinion P0. The carrier CR0 of the power splitting planetary gear 21 is coupled with the input shaft 10, the sun gear S0 is coupled with the rotor 25 of the first electric motor 20 and the ring gear R0 is coupled with the output shaft 12. The power splitting planetary gear 21 constructed as described above splits the motive power inputted to the carrier CR0 via the input shaft 10 to the first electric motor 20 via the sun gear S0 and to the output shaft 12 via the ring gear R0 based on the control on the revolution of the first electric motor 20. It is noted that the power split to the first electric motor 20 is used for generating electricity and the power split to the output shaft 12 is used for driving the vehicle 1.

The transmission 22 has the so-called Ravigneaux type planetary gear unit 27 comprising one double pinion planetary gear and the single planetary gear that uses one of their pinions in common. The transmission 22 also has the first and second brakes B1 and B2.

The planetary gear unit 27 is composed of two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

In the hybrid driving unit 7B shown in FIG. 7, among the four devices of the first electric motor 20, the second electric motor 23, the power splitting planetary gear 21 and the transmission 22, the former three devices are disposed on the input shaft 10 and the remaining transmission 22 is disposed on the output shaft 12. These are coupled to each other as described below and shown in the figure.

The input shaft 10 is coupled with the rear side of the carrier (first rotary element) CR0 of the power splitting planetary gear 21 through the inner peripheral side of the first electric motor 20, the second electric motor 23 and the power splitting planetary gear 21. The output shaft 12 is coupled with the carrier (output element) CR1 of the transmission 22 and with the ring gear (third rotary element) R0 of the power splitting planetary gear 21 through the inner peripheral side of the transmission 22 and between the transmission 22 and the power splitting planetary gear 21. The rotor 25 of the first electric motor 20 is coupled with the sun gear (second rotary element) S0 of the power splitting planetary gear 21 through between the outer peripheral side of the input shaft 10 and the inner peripheral side of the second electric motor 23. Then, the rotor 29 of the second electric motor 23 is coupled with the sun gear (input element) S1 by passing between the second electric motor 23 and the power splitting planetary gear 21, through the outer peripheral side of the power splitting planetary gear 21, between the power splitting planetary gear 21 and the transmission 22 and through the inner peripheral side of the sun gear S2 of the transmission 22.

Here, with regard the longitudinal disposition of the first electric motor 20, the second electric motor 23, the power splitting planetary gear 21 and the transmission 22 described above, i.e., the disposition along the axis 13, the first and second electric motors 20 and 23 are disposed adjacently to each other in the invention. Still more, the first electric motor 20 is disposed on the side closer to the front (the side of the internal combustion engine) than the second electric motor 23 and at the foremost position.

It is noted that the operation and effect of the hybrid driving unit 7B explained with reference to the skeleton view in FIG. 7 will be explained after detailing the concrete structure of the hybrid driving unit 7B with reference to FIG. 8.

Figure 8:
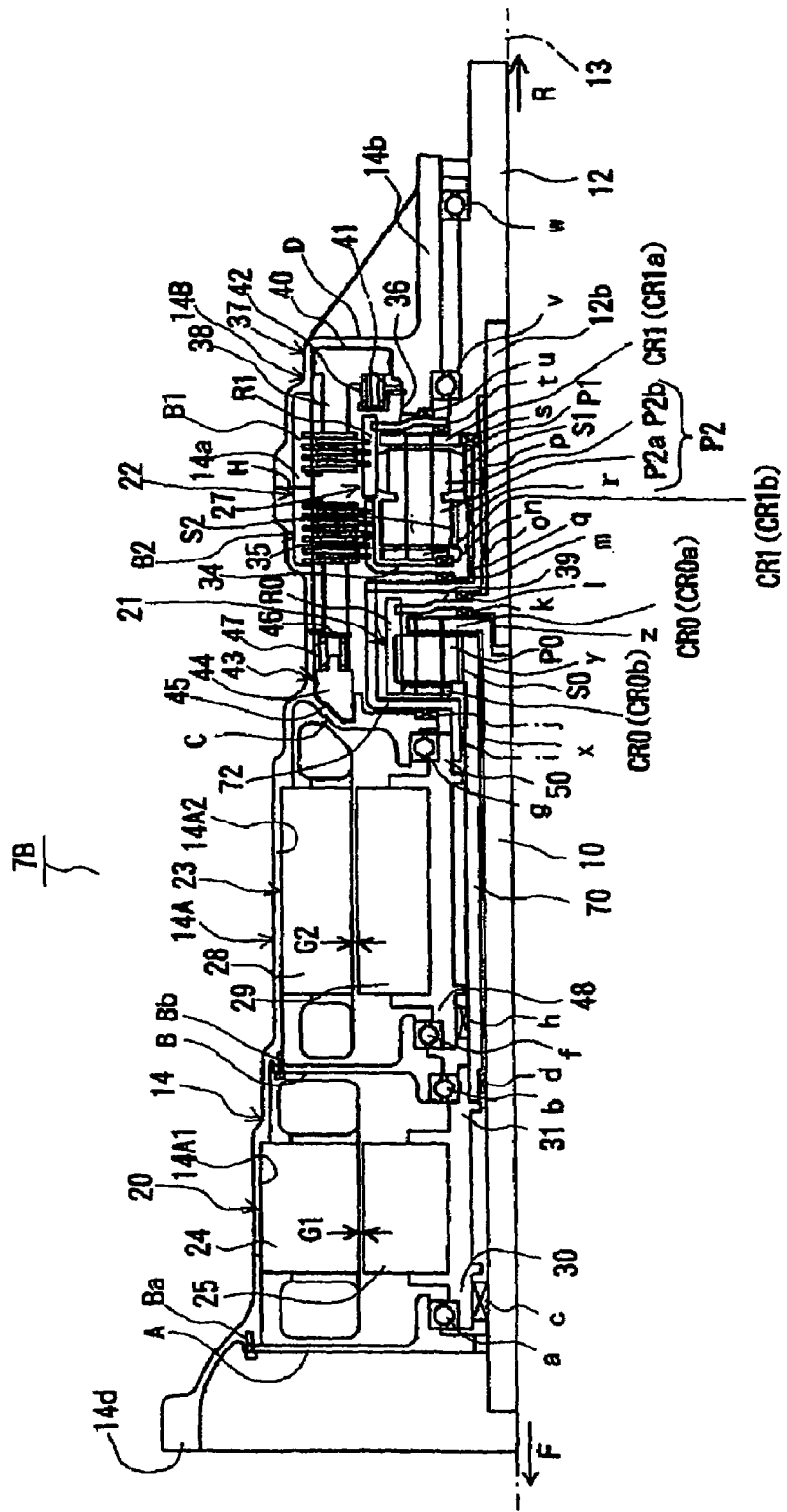
FIG. 8 is a longitudinal section view showing the structure of the hybrid driving unit of the second embodiment.

FIG. 8 shows an upper half portion of the longitudinal section view of the hybrid driving unit 7B including the axis 13.

The hybrid driving unit 7B shown in FIG. 8 comprises the input shaft 10 and the output shaft 12 disposed on the axis 13 and the first electric motor 20, the second electric motor 23, the power splitting planetary gear 21 and the transmission 22 disposed around the axis 13. All of these devices are stored within the casing member 14, except of a part of the rear end of the output shaft 12 projecting out of the casing member 14 to the rear.

Taking the readiness of assembly and others into account, the casing member 14 is divided into a plurality of parts in the longitudinal direction along the axis 13 and is formed in a body by combining joints of the respective parts. In the embodiment shown in FIG. 8, the casing member 14 is built by combining the front partial case 14A with the rear partial case 14B at the joint H. Note that the joint H is provided at the part storing the power splitting planetary gear 21 and the transmission 22, or more specifically in the vicinity between the second and first brakes B2 and B1 of the transmission 22. In the casing member 14, a plurality of partitions, i.e., partitions A, B, C and D, are formed at different positions in the longitudinal direction in order from the front side. Among the partitions A through D, the partitions A and D are disposed in the vicinity of the front and rear ends of the casing member 14, respectively, and the space within the case between the partitions A and D is divided into three spaces by the partitions B and C longitudinally along the axis 13. These partitions A through D act as members for reinforcing the casing member 14 and are used for retaining bearings a through z described later and for forming the hydraulic chambers 40 and 45 described later. Among the partitions A through D, the partitions A and B are formed by disc-like partition members, i.e., separate members, fixed to the positions shown in the figure by fastening a plurality of bolts Ba and Bb (one each is shown in the figure) in the vicinity of the edge thereof. Still more, the radial size of the motor storage section 14A1 on the front side of the partition B in the partial case 14A is set to be larger than that of the motor storage section 14A2 on the rear side. It improves the mountability of the hybrid driving unit 7A in mounting to the FR-type vehicle 1.

The first electric motor 20, the second electric motor 23, the power splitting planetary gear 21 and the transmission 22 are stored within the three spaces divided by the partitions A through D, respectively. That is, the first electric motor 20 is stored in the space between the partitions A and B, the second electric motor 23 is stored between the partitions B and C, and the transmission 22 and the power splitting planetary gear 21 are stored between the partitions C and D, respectively. Beginning from the first electric motor 20, these devices will be detailed in order below.

The first electric motor 20 comprises an AC permanent magnet synchronous motor (brushless DC motor) for example. It is stored between the partitions A and B and is disposed on the outer diametric side of the input shaft 10 coaxially therewith. The first electric motor 20 has the stator 24 fixed to the inner peripheral face of the casing member 14 and the rotor 25 rotatably disposed on the inner diametric side of the stator 24 apart from the stator 24 by a predetermined air gap G1. The inner diametric side of the rotor 25 is formed into a cylindrical shape and stages 30 and 31 are formed at the front and rear outer peripheral faces of the cylindrical part. The casing member 14 rotatably supports the rotor 25 through an intermediary of bearings a and b fitted between these stages 30 and 31 and the partitions A and B while being positioned in the longitudinal direction. The sleeve 70 extending to the rear is fitted around the outer peripheral face of the input shaft 10 at the rear end of the cylindrical part. The edge of the sleeve 70 is coupled with the rear end of the rotor 25 and the rear end thereof is coupled with the sun gear S0 of the power splitting planetary gear 21 through the inside of the second electric motor 23 described later. The sleeve 70 is relatively and rotatably supported by the input shaft 10 through the intermediary of bearings d and x fixed to the outer peripheral face of the input shaft 10 and the sun gear S0 is relatively and rotatably supported by the input shaft 10 through an intermediary of a bearing y fixed to the outer peripheral face of the input shaft 10. It is noted as for the disposition in the longitudinal direction that the bearing d is disposed at the position corresponding to the bearings b and the bearing x is disposed at the position corresponding to the bearing g in the partition C. The casing member 14 rotatably supports the both ends of the input shaft 10 through the intermediary of the bearing c between the input shaft 10 and the rotor 25 provided at the position axially overlapping with the bearing a and with the bearing a supporting the rotor 25 at the front end thereof, and through the intermediary of the bearing x provided between the input shaft 10 and the sleeve 70 provided at the position axially overlapping with the bearing g, with the bearing i between the sleeve 70 and the rotor 29 of the second electric motor 23 and with the bearing g in the partition C supporting the rotor 29 of the second electric motor 23. Still more, a hollow cylindrical section is formed at the rear end of the input shaft 10, into which a boss section projecting from the front end of a front end coupling section 12b of the output shaft 12 is inserted. The bearing z is fitted between the inner peripheral face of the hollow cylindrical section and the outer peripheral face of the boss section. This bearing z supports the rear carrier plate CR0a of the carrier CR0 of the power splitting planetary gear 21 described later. Because the rotor 25 of the first electric motor 20 is rotatably supported by the casing member 14 and the input shaft 10 so as to be sandwiched by the bearings a and b fixed to the partitions A and B and by the bearings c and d fixed to the outer peripheral face of the input shaft 10 as described above, the position of the rotor 25 in the longitudinal and radial directions may be assured accurately. Accordingly, even if a force bending the casing member 14 in the vertical or horizontal direction acts on the casing member 14, the predetermined air gap G1 between the stator 24 and the rotor 25 may be kept accurately. It is noted that the first electric motor 20 is connected to the HV battery via the inverter as described above. The main function of the first electric motor 20 constructed as described above is to generate electricity and to charge the HV battery via the inverter based on the power split to the sun gear S0 of the power splitting planetary gear 21 described later.

The second electric motor 23 comprises an AC permanent magnet synchronous motor (brushless DC motor) for example and is disposed on the outer diametric side of the input shaft 10 coaxially therewith. The second electric motor 23 has the stator 28 fixed to the inner peripheral face of the casing member 14 and the rotor 29 rotatably disposed on the inner diametric side of the stator 28 apart from the stator 28 by a predetermined air gap G2. The inner diametric side of the rotor 29 is formed into a cylindrical shape and stages 48 and 50 are formed, respectively, at the front and rear outer peripheral faces of the cylindrical part. The casing member 14 rotatably supports the rotor 29 through an intermediary of bearings f and g fitted between the stages 48 and 50 and the partitions B and C while being positioned in the longitudinal direction. The rear end of the cylindrical part is coupled with the sun gear S1 of the transmission 22 described later via a coupling member 72. The coupling member 72 has a first sleeve portion coupled with the rear end of the rotor 29, a first flange portion extending to the outer diametric side along the power splitting planetary gear 21 from the rear end of the first sleeve portion, a drum portion extending to the rear from the outer diametric end of the first flange portion, a second flange portion extending to the inner diametric side from the rear end of the drum portion and a second sleeve portion extending to the rear from the inner diametric end of the second flange portion. The second sleeve portion is coupled with the sun gear S1. The rotor 29, the coupling member 72 and the sun gear S1 mutually formed in a body are rotatably supported by the bearings h and i fitted between them and the outer peripheral face of the sleeve 70, the bearing j fitted between the coupling member 72 and the inner diametric rear face of the partition C, the bearing 1 fitted between the coupling member 72 and the inner diametric rear face of a flange portion 39 described later and the bearings o and p fitted between the coupling member 72 and the outer peripheral face of the front end coupling section 12b of the output shaft 12. It is noted that the bearings h and i are disposed at the positions corresponding to the bearings f and g in terms of the disposition in the longitudinal direction. Since the casing member 14 rotatably supports the rotor 29 of the second electric motor 23 through the intermediary of the bearings f and g fixed to the partitions B and C as described above, the longitudinal and radial positions of the rotor 29 may be maintained accurately. Accordingly, even if a force that may bend the casing member 14 in the vertical or lateral direction acts thereon, the predetermined air gap G2 between the stator 28 and the rotor 29 may be kept accurately. It is noted that the second electric motor 23 is connected to the HV battery via the inverter similarly to the first electric motor 20 described above.

The power splitting planetary gear 21 is disposed on the inner diametric side in the front half of the space between the partitions C and D of the casing member 14. The power splitting planetary gear 21 is composed of the single pinion planetary gear disposed coaxially with the input shaft 10 as described above and has the ring gear (third rotary element) R0, the sun gear (second rotary element) S0 and the carrier (first rotary element) CR0 supporting the pinions P0. Among them, the rear end of the ring gear R0 extends to the rear and is coupled with an outer diametric end of a flange section 39 extending to the outer diametric side from the vicinity of the front end of the front end coupling portion 12b of the output shaft 12 along the rear carrier CR0a. The rear carrier plate CR0a of the carrier CR0 is coupled with the rear end of the input shaft 10. The sun gear S0 is coupled with the rear end of the rotor 25 of the first electric motor 20 via the sleeve 70 described above. In the power splitting planetary gear 21, the bearing k is fitted between the inner diametric rear face of the rear carrier plate CR0b of the carrier CR0 and the inner diametric front face of the flange section 39 described above and the bearing 1 is fitted between the inner diametric rear face of the flange section 39 and the coupling member 72 described above, respectively. Thus, in the power splitting planetary gear 21, the carrier CR0, which is the input section, is fixed to the input shaft 10 and the sun gear S0 and the ring gear R0, which are the output sections (to which power is split), are coupled with the rear end of the rotor 25 of the first electric motor 20 and with the front end of the front end coupling section 12b of the output shaft 12, respectively. That is, the power splitting planetary gear 21 is arranged so as to split the power of the internal combustion engine 5 inputted to the carrier CR0 via the input shaft 10 (see FIG. 1) to the side of the first electric motor 20 via the sun gear S0 and to the side of the output shaft 12 via the ring gear R0. The ratio of split of power at this time is decided based on the state of revolution of the first electric motor 20. That is, when the rotor 25 of the first electric motor 20 is caused to generate a large power, an amount of power generated by the first electric motor 20 increases and the power outputted to the output shaft 12 is reduced to that extent. When the rotor 25 of the first electric motor 20 is caused to generate a small power in contrary, an amount of power generated by the first electric motor 20 decreases and the power outputted to the output shaft 12 increases to that extent.

The transmission 22 is disposed on the rear half part and on the outer diametric side of the front half part in the space between the partitions C and D of the casing member 14. The transmission 22 has the Ravigneaux type planetary gear unit 27 disposed on the inner diametric side and the first and second brakes B1 and B2 disposed, respectively, on the rear and front sides on the outer diametric side of the unit.

The planetary gear unit 27 has a first sun gear S1 (hereinafter simply referred to as 'the sun gear S1'), a second sun gear S2 (hereinafter simply referred to as 'the sun gear S2') disposed on the front side of the sun gear S1 and slightly on the outer diametric side, the ring gear R1 disposed on the outer diametric side of the sun gear S1, the pinion P1 engaging with the sun gear S1 and the ring gear R1, the pinion P2 composing the common long pinion and engaging with the sun gear S2 and the pinion P1, and the carrier CR1 supporting these pinions P1 and P2. Beginning from the sun gear S1, these parts will be explained below.

The sun gear S1 is coupled with the rear end of the rotor 29 of the second electric motor 23 described above via the sleeve 72 described-above. Part of the sun gear S1 is rotatably supported through an intermediary of the bearings o and p fitted to the outer peripheral face of the front end coupling section 12b of the output shaft 12.

The sun gear S2 is formed in a body with the flange portion 34 extending from the front end of the sun gear S2 to the outer diametric side along the front carrier plate CR1b of the carrier CR1 and with the drum portion 35 extending to the rear from the outer diametric end of the flange portion 34. The second brake B2 described later is interposed between the outer peripheral face of this drum portion 35 and the inner peripheral spline 14a of the inner peripheral face of the casing member 14. The sun gear S2 is rotatably supported by bearings q and r fitted to the outer peripheral face of the second sleeve portion of the coupling member 72 formed in a body with the sun gear S1 described above and bearings m and n fitted, respectively, to the front and rear faces on the inner diametric side (basal end side) of the flange portion 34. It is noted that the bearing m is interposed between the flange portion 34 and the coupling member 72 and the bearing n is interposed between the flange portion 34 and the inner diametric front face of the front carrier plate CR1b of the carrier CR1.

The ring gear R1 is provided with the flange portion 36 fixed at the rear end thereof and extending to the inner diametric side along the rear carrier plate CR1a of the carrier CR1 and is rotatably supported by bearings t and u fitted to the inner diametric front and rear faces of the flange portion 36. The bearing t is interposed between the flange portion 36 and the rear carrier plate CR1a of the carrier CR1 and the bearing u is interposed between the flange portion 36 and the partition D. The first brake B1 is interposed between the outer peripheral face of the ring gear R1 and the inner peripheral spline 14a of the inner peripheral face of the casing member 14.

The pinion P1 is rotatably supported by the carrier CR1 and is engaged with the sun gear S1 described above on the inner diametric side and with the ring gear R1 described above on the outer diametric side.

The pinion P2 is the common long pinion in which the large-diametric gear P2a formed on the front side and the small-diametric gear P2b formed on the rear side are combined in a body. In the pinion P2, the large-diametric gear P2a is engaged with the sun gear S2 described above and the small-diametric gear P2b is engaged with the pinion P1 described above.

The carrier CR1 rotatably supports the pinions P1 and P2 by the front and rear carrier plates CR1b and CR1a. The rear carrier plate CR1a is coupled with the front end of the output shaft 12. The rear carrier plate CR1a is rotatably supported by the bearing s fitted between the inner diametric front face thereof and the rear end face of the sun gear S1 and the bearing t described above.

The first brake B1 has a number of discs and friction plates (brake plates) and is spline-coupled between an outer peripheral spline formed on the outer peripheral face of the ring gear R1 described above and the inner peripheral spline 14a formed on the inner peripheral face of the casing member 14. A hydraulic actuator 37 for the first brake is disposed on the rear side of the first brake B1. The hydraulic actuator 37 has the piston 38 disposed on the rear side of the first brake B1 so as to be movable in the longitudinal direction, the first hydraulic chamber 40 which is provided at the outer diametric front face of the partition D of the casing member 14 and into which the rear end of the piston 38 is oil-tightly fitted and the return spring (compression spring) 42 interposed between the retainer 41 fixed to a part of the partition D and the inner diametric front face of the piston 38 to bias the piston 38 to the rear.

The second brake B2 is disposed just before the first brake B1 described above. The second brake B2 has a number of discs and friction plates (brake plates) and is spline-coupled between the outer peripheral spline formed on the outer peripheral face of the drum portion 35 combined with the sun gear S2 described above and the inner spline 14a formed on the inner peripheral face of the casing member 14. The hydraulic actuator 43 for the second brake is disposed on the front side of the second brake B2 so that it is positioned on the outer diametric side of the power splitting planetary gear 21 described above. The hydraulic actuator 43 has the piston 44 disposed on the front side of the second brake B2 so as to be movable in the longitudinal direction, the second hydraulic chamber 45 which is provided at the outer diametric rear face of the partition C and into which the front end of the piston 44 is oil-tightly fitted, and the return spring (compression spring) 47 interposed between the retainer 46 fixed to the inner peripheral face of the casing member 14 and a part of the piston 44 to bias the piston 44 to the front.

In the transmission 22 constructed as described above, an output from the second electric motor 23 is transmitted to the sun gear S1 via the coupling member 72. In a low state, the first brake B1 is engaged and the second brake B2 is released. Accordingly, the ring gear R1 is locked and the sun gear S2 is freely rotatable in this state. The revolution of the first sun gear S1 described above is largely reduced via the pinion P1 and is transmitted to the carrier CR1. The revolution of the carrier CR1 is then transmitted to the output shaft 12.

When the transmission 22 is in a high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolution and the revolution of the carrier CR1 reduced relatively in small is transmitted to the output shaft 12 at this time.

Thus, the transmission 22 transmits the largely reduced revolution to the output shaft 12 in the low state by engaging the first brake B1 and by releasing the second brake B2, respectively. In contrary, it transmits the revolution reduced relatively in small to the output shaft 12 by releasing the first brake B1 and by engaging the second brake B2, respectively. Because the transmission 22 is thus capable of shifting in the two stages, the second electric motor 23 maybe downsized. That is, the transmission 22 enables to use a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

The casing member 14 storing the first electric motor 20, the second electric motor 23, the power splitting planetary gear 21 and the transmission 22 as described above has a boss section 14b extending to the rear on the inner diametric side of the rearmost partition D and rotatably supports the output shaft 12 by the boss section 14b through an intermediary of bearings v and w.

The coupling section 14d at the front end of the casing member 14 is connected with the internal combustion engine 5 rubber-mounted to the body 4 (see FIG. 1) and the rear end thereof is rubber-mounted to a part of the body by utilizing the mounting section not shown.

In the hybrid driving unit 7B constructed as described above, the motive power inputted to the input shaft 10 is inputted to the carrier CR0 of the power splitting planetary gear 21 to be split (divided) to the sun gear S0 and the ring gear R0 as shown in the skeleton view of FIG. 7. Among them, the motive power split to the sun gear S0 is inputted to the rotor 25 of the first electric motor 20 to be used to generate electricity. The electricity thus generated is charged to the HV battery via the inverter. The second electric motor 23 receives the electricity supplied from the HV battery via the inverter and drives the output shaft 12 via the transmission 22. That is, the motive power from the internal combustion engine 5 is combined with the power from the second electric motor 23 and is outputted to the output shaft 12. It is noted that because the transmission 22 is arranged so as to be capable of switching between the high and low states as described above, power corresponding to the high or low state is outputted to the output shaft 12.

Since the first electric motor 20 and the second electric motor 23 are disposed adjacently to each other on the axis 13 as shown in FIG. 8 in the present embodiment, the parts of the case storing these first and second electric motors 20 and 23 may be combined, thus facilitating the accommodation in producing the unit in series. It also brings about such effects that a number of parts and, hence the cost, may be reduced, the accuracy for supporting the two electric motors 20 and 23 may be improved, the length of power cables of the two electric motors 20 and 23 may be almost equalized regardless of the position of the controller for controlling them, the length of the cable may be minimized when the inverter is disposed within an engine room on the front side of the vehicle, thus minimizing the loss of electricity, and others.

Next, a first modification (corresponding to the 16-th aspect of the invention) of the hybrid driving unit 7B of the present embodiment will be explained with reference to a skeleton view in FIG. 9.

Figure 9:
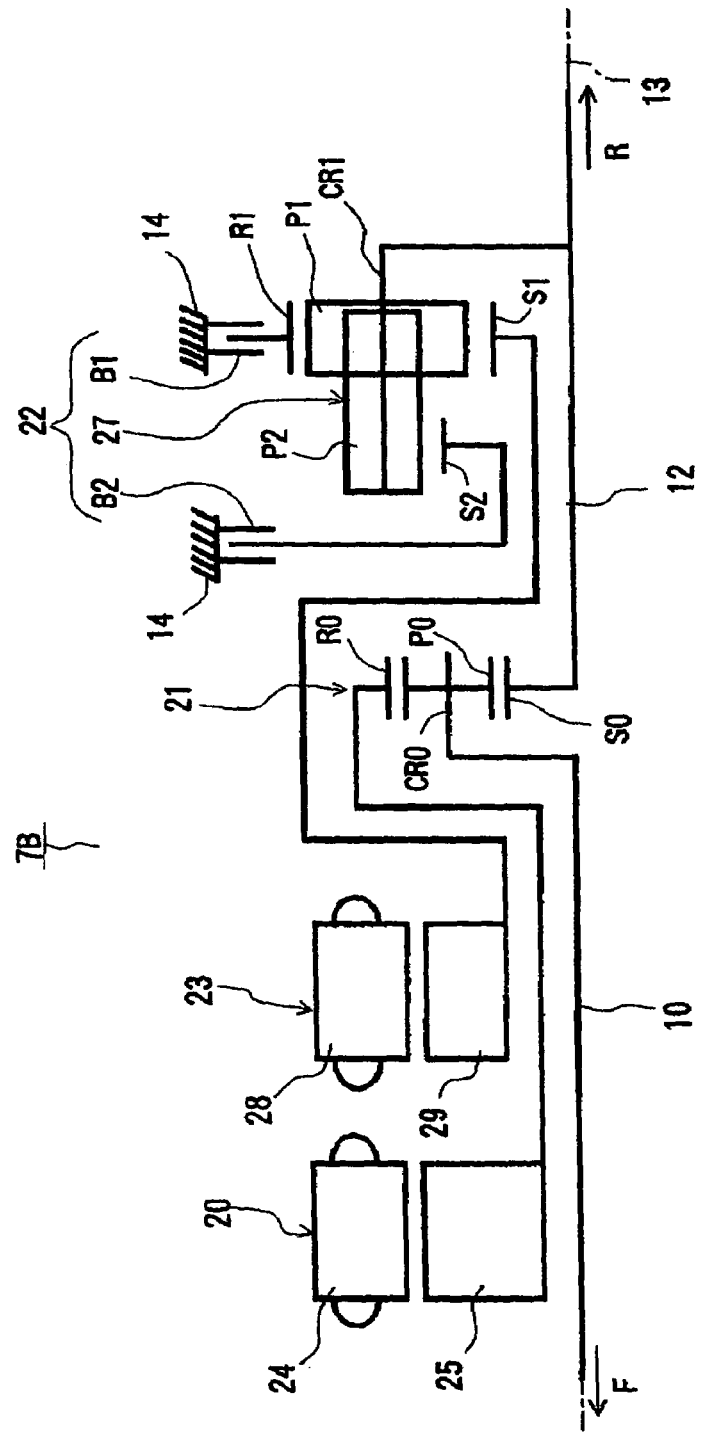
FIG. 9 is a skeleton view showing a first modification of the hybrid driving unit of the second embodiment.

As shown in FIG. 9, the hybrid driving unit 7B has the first electric motor 20, the second electric motor 23, the power splitting planetary gear 21 and the transmission 22 in order from the side closer to the internal combustion engine 5 in FIG. 1, i.e., in order from the front to the rear. All of these are stored within the casing member 14 (see FIG. 1) and are disposed in line around the axis 13 in order from the front. These devices will be explained below in the order of the first electric motor 20, the second electric motor 23, the power splitting planetary gear 21 and the transmission 22.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the ring gear R0 of the power splitting planetary gear 21 described later. The first electric motor 20 constructed as described above mainly generates electricity based on the motive power inputted via the ring gear R0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described later. Similarly to the first electric motor 20 described above, the second electric motor 23 is connected to the HV battery via the inverter. The second electric motor 23 functions mainly as a driving motor for assisting the motive power of the vehicle 1. However, the second electric motor 23 also functions as a generator when the brake is applied to the vehicle for example by regenerating vehicular inertia force as electrical energy.

The power splitting planetary gear 21 is composed of the single pinion planetary gear disposed coaxially with the output shaft 12. The power splitting planetary gear 21 has the carrier (first rotary element) CR0 supporting a plurality of pinions P0, the sun gear (third rotary element) S0 engaging with the pinion P0 and the ring gear (second rotary element) R0 engaging with the pinion P0. The carrier CR0 of the power splitting planetary gear 21 is coupled with the input shaft 10, the ring gear R0 is coupled with the rotor 25 of the first electric motor 20 and the sun gear S0 is coupled with the output shaft 12. The power splitting planetary gear 21 constructed as described above splits the motive power inputted to the carrier CR0 via the input shaft 10 to the first electric motor 20 via the ring gear R0 and to the output shaft 12 via the sun gear S0 based on the control on the revolution of the first electric motor 20. It is noted that the power split to the first electric motor 20 is used for generating electricity and the power split to the output shaft 12 is used for driving the vehicle 1.

The transmission 22 has the so-called Ravigneaux type planetary gear unit 27 comprising one double pinion planetary gear and the single planetary gear that uses one of their pinions in common. The transmission 22 also has the first and second brakes B1 and B2.

The planetary gear unit 27 is composed of the two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

In the hybrid driving unit 7B shown in FIG. 9, among the four devices of the first electric motor 20, the second electric motor 23, the power splitting planetary gear 21 and the transmission 22, the former two devices are disposed on the input shaft 10 and the remaining two devices are disposed on the output shaft 12. These are coupled to each other as described below and shown in the figure.

The input shaft 10 is coupled with the front side (the side of the second electric motor 23) of the carrier (first rotary element) CR0 of the power splitting planetary gear 21 through the inner peripheral side of the first electric motor 20 and the second electric motor 23. The output shaft 12 is coupled with the carrier (output element) CR1 of the transmission 22 as well as to the sun gear (third rotary element) S0 of the power splitting planetary gear 21 through the inner peripheral side of the transmission 22. The rotor 25 of the first electric motor 20 is coupled with the ring gear (second rotary element) R0 of the power splitting planetary gear 21 through the parts between the outer peripheral side of the input shaft 10 and the inner peripheral side of the second electric motor 23 and between the second electric motor 23 and the power splitting planetary gear 21. Then, the rotor 29 of the second electric motor 23 is coupled with the sun gear (input element) S1 through between the second electric motor 23 and the power splitting planetary gear 21, the outer peripheral side of the power splitting planetary gear 21, the part between the power splitting planetary gear 21 and the transmission 22 and the inner peripheral side of the sun gear S2 of the transmission 22.

Next, a second modification (corresponding to the 17-th aspect of the invention) of the hybrid driving unit 7B of the present embodiment will be explained with reference to a skeleton view in FIG. 10.

Figure 10:
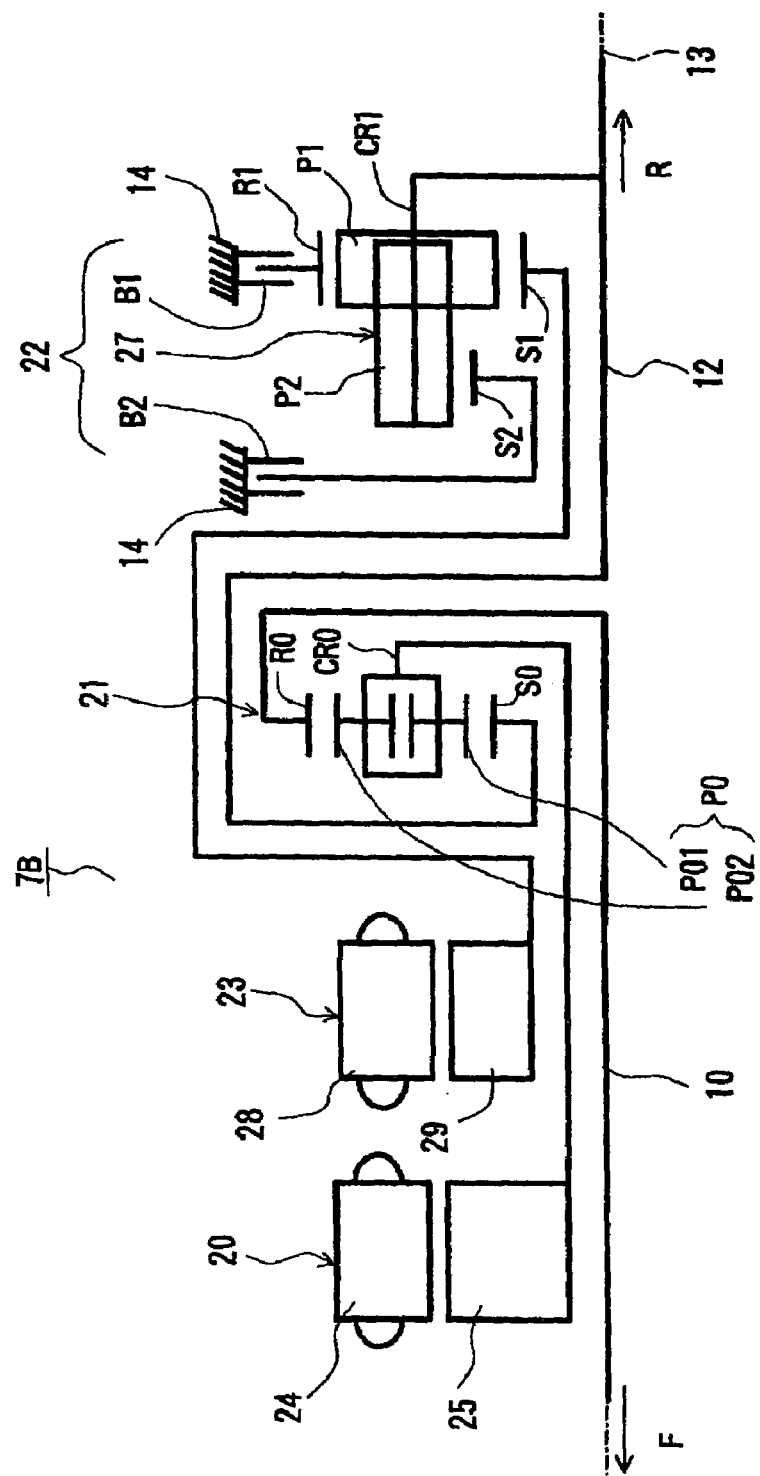
FIG. 10 is a skeleton view showing a second modification of the hybrid driving unit of the second embodiment.

As shown in FIG. 10, the hybrid driving unit 7B comprises the first electric motor 20, the second electric motor 23, the power splitting planetary gear 21 and the transmission 22 in order from the side closer to the internal combustion engine 5 in FIG. 1, i.e., in order from the front to the rear. All of these are stored within the casing member 14 (see FIG. 1) and are disposed in line around the axis 13 in order from the front along the axis 13. These devices will be explained below in the order of the first electric motor 20, the second electric motor 23, the power splitting planetary gear 21 and the transmission 22.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the carrier CR0 of the power splitting planetary gear 21 described later. The first electric motor 20 arranged as described above mainly generates electricity based on the motive power inputted via the carrier CR0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described later. Similarly to the first electric motor 20 described above, the second electric motor 23 is connected to the HV battery via the inverter. The second electric motor 23 functions mainly as a driving motor for assisting the motive power (driving force) of the vehicle 1. However, the second electric motor 23 also functions as a generator when the brake is applied to the vehicle for example by regenerating vehicular inertia force as electrical energy.

The power splitting planetary gear 21 is composed of the double pinion planetary gear disposed coaxially with the input shaft 10. The power splitting planetary gear 21 has the carrier (second rotary element) CR0 supporting the plurality of pinions P0 (P01 and P02), the sun gear (third rotary element) S0 engaging with the pinion P1 and the ring gear (first rotary element) R0 engaging with the pinion P02. The ring gear R0 of the power splitting planetary gear 21 is coupled with the input shaft 10, the carrier CR0 is coupled with the rotor 25 of the first electric motor 20 and the sun gear S0 is coupled with the output shaft 12. The power splitting planetary gear 21 described above splits the motive power inputted to the ring gear R0 via the input shaft 10 to the first electric motor 20 via the carrier CR0 and to the output shaft 12 via the sun gear S0 based on the control on the revolution of the first electric motor 20. It is noted that the power split to the first electric motor 20 is used for generating electricity and the power split to the output shaft 12 is used for driving the vehicle 1.

The transmission 22 has the so-called Ravigneaux type planetary gear unit 27 comprising one double pinion planetary gear and the single planetary gear that uses one of their pinions in common. The transmission 22 also has the first and second brakes B1 and B2.

The planetary gear unit 27 is composed of the two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is the input member (input element), is coupled with the rotor 29 of the second electric motor 23 described above, and the carrier CR1, which is the output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other as described later. That is, the transmission 22 is arranged so as to change the degree of the motive power inputted from the second electric motor 23 described above via the sun gear S1 and to transmit it to the output shaft 12 via the carrier CR1.

In the hybrid driving unit 7B shown in FIG. 10, the front three devices among the four devices of the first electric motor 20, the second electric motor 23, the power splitting planetary gear 21 and the transmission 22 are disposed on the input shaft 10 and the remaining one device is disposed on the output shaft 12. These are coupled to each other as described below and shown in the figure.

The input shaft 10 is coupled with the ring gear (first rotary element) R0 of the power splitting planetary gear 21 through the inner peripheral side of the first electric motor 20, the second electric motor 23 and the power splitting planetary gear 21 and the part between the power splitting planetary gear 21 and the transmission 22. The output shaft 12 is coupled with the carrier (output element) CR1 of the transmission 22 as well as to the sun gear (third rotary element) S0 of the power splitting planetary gear 21 through the inner peripheral side of the transmission 22, the part between the transmission 22 and the power splitting planetary gear 21, the outer peripheral side of the power splitting planetary gear 21 and the part between the power splitting planetary gear 21 and the second electric motor 23. The rotor 25 of the first electric motor 20 is coupled with the rear side (transmission side) of the carrier (second rotary element) CR0 of the power splitting planetary gear 21 through the outer peripheral side of the input shaft 10 and the inner peripheral side of the second electric motor 23 and the power splitting planetary gear 21. Then, the rotor 29 of the second electric motor 23 is coupled with the sun gear (input element) S1 through between the second electric motor 23 and the power splitting planetary gear 21, the outer peripheral side of the power splitting planetary gear 21, the part between the power splitting planetary gear 21 and the transmission 22 and the inner peripheral side of the sun gear S2 of the transmission 22.

Next, a third modification (corresponding to the 18-th aspect of the invention) of the hybrid driving unit 7B of the present embodiment will be explained with reference to a skeleton view in FIG. 11.

Figure 11:
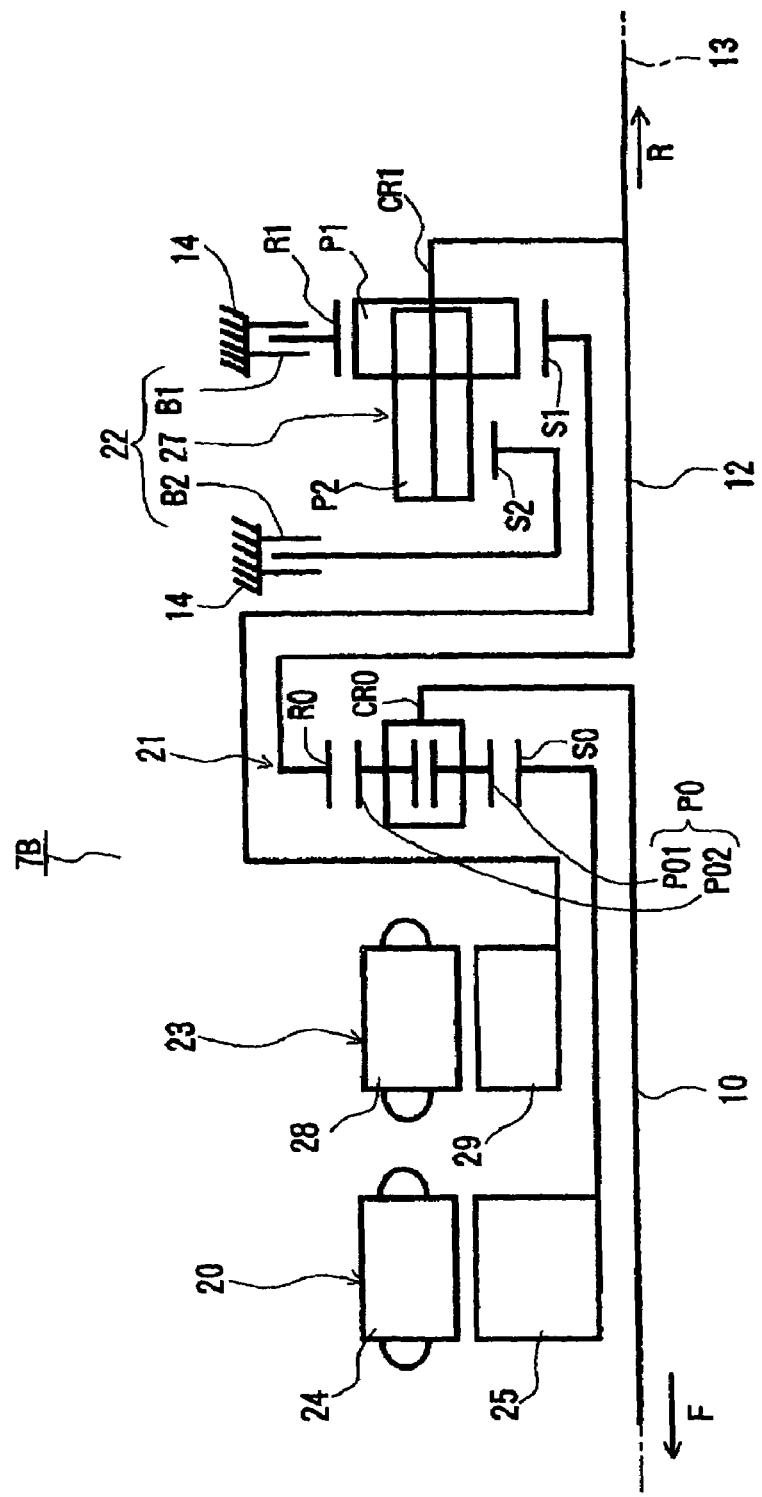
FIG. 11 is a skeleton view showing a third modification of the hybrid driving unit of the second embodiment.

As shown in FIG. 11, the hybrid driving unit 7B comprises the first electric motor 20, the second electric motor 23, the power splitting planetary gear 21 and the transmission 22 in order from the side closer to the internal combustion engine 5 in FIG. 1, i.e., in order from the front to the rear. All of these are stored within the casing member 14 (see FIG. 1) and are disposed in line around the axis 13 in order from the front along the axis 13. These devices will be explained below in the order of the first electric motor 20, the second electric motor 23, the power splitting planetary gear 21 and the transmission 22.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the sun gear S0 of the power splitting planetary gear 21 described later. The first electric motor 20 mainly generates electricity based on the motive power inputted via the sun gear S0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with the sun gear S1 of the transmission 22 described later. Similarly to the first electric motor 20 described above, the second electric motor 23 is connected to the HV battery via the inverter. The second electric motor 23 mainly functions as a driving motor for assisting the motive power (driving force) of the vehicle 1. However, the second electric motor 23 also functions as a generator when the brake is applied to the vehicle for example by regenerating vehicular inertia force as electrical energy.

The power splitting planetary gear 21 is composed of the double pinion planetary gear disposed coaxially with the input shaft 10. The power splitting planetary gear 21 has the carrier (first rotary element) CR0 supporting the plurality of pinions P0 (P01 and P02), the sun gear (second rotary element) S0 engaging with the pinion P01 and the ring gear (third rotary element) R0 engaging with the pinion P02. The carrier CR0 of the power splitting planetary gear 21 is coupled with the input shaft 10, the sun gear S0 is coupled with the rotor 25 of the first electric motor 20 and the ring gear R0 is coupled with the output shaft 12. The power splitting planetary gear 21 constructed as described above splits the motive power inputted to the carrier CR0 via the input shaft 10 to the first electric motor 20 via the sun gear S0 and to the output shaft 12 via the ring gear R0 based on the control on the revolution of the first electric motor 20. It is noted that the power split to the first electric motor 20 is used for generating electricity and the power split to the output shaft 12 is used for driving the vehicle 1.

The transmission 22 has the so-called Ravigneaux type planetary gear unit 27 composed of one double pinion planetary gear and the single planetary gear that uses one of their pinions in common. The transmission 22 also has the first and second brakes B1 and B2.

The planetary gear unit 27 is composed of the two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other as described later. That is, the transmission 22 is arranged so as to change the degree of the motive power inputted from the second electric motor 23 described above via the carrier CR1 and to transmit it to the output shaft 12 via the carrier CR1.

In the hybrid driving unit 7B shown in FIG. 11, the front three devices of the four devices of the first electric motor 20, the second electric motor 23, the power splitting planetary gear 21 and the transmission 22 are disposed on the input shaft 10 and the rearmost one is disposed on the output shaft 12. These are coupled each other as follows as shown in the figure.

The input shaft 10 is coupled with the rear side (the transmission 22 side) of the carrier (first rotary element) CR0 of the power splitting planetary gear 21 through the inner peripheral side of the first electric motor 20, the second electric motor 23 and the power splitting planetary gear 21. The output shaft 12 is coupled with the carrier (output element) CR1 of the transmission 22 as well as with the ring gear (third rotary element) R0 of the power splitting planetary gear 21 through the inner peripheral side of the power splitting planetary gear 21 and between the transmission 22 and the power splitting planetary gear 21. The rotor 25 of the first electric motor 20 is coupled with the sun gear (second rotary element) S0 of the power splitting planetary gear 21 through between the outer peripheral side of the input shaft 10 and the inner peripheral side of the second electric motor 23. Then, the rotor 29 of the second electric motor 23 is coupled with the sun gear (input element) S1 through between the second electric motor 23 and the power splitting planetary gear 21, the outer peripheral side of the power splitting planetary gear 21, the part between the power splitting planetary gear 21 and the transmission 22 and the inner peripheral side of the sun gear S2 of the transmission 22.

Third Embodiment

Next, a hybrid driving unit 7C of a third embodiment will be explained as another example of the inventive hybrid driving unit 7 mounted to the vehicle 1 shown in FIG. 1 with reference to the skeleton view in FIG. 12. It is noted that in the figure, the direction indicated by the arrow F denotes the front side of the body (the internal combustion engine side) and the direction indicated by the arrow R denotes the rear side thereof (the differential unit side).

Figure 12:
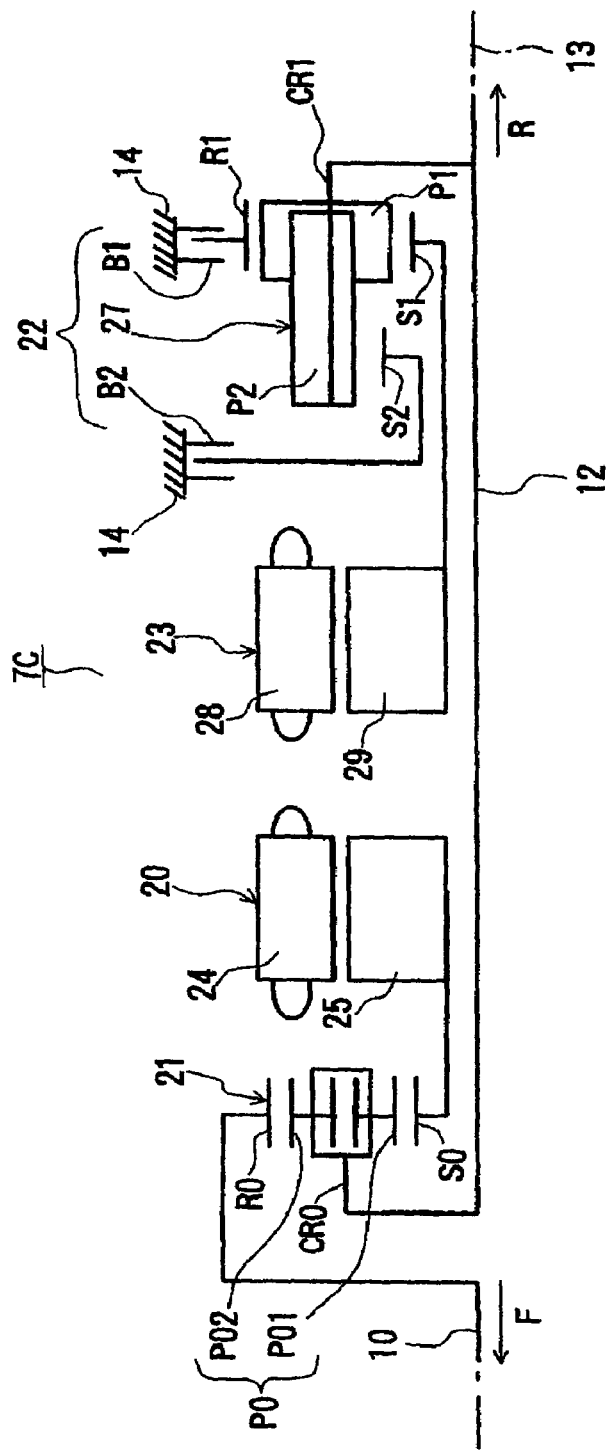
FIG. 12 is a skeleton view showing a hybrid driving unit of a third embodiment.

As shown in FIG. 12, the hybrid driving unit 7C comprises the power splitting planetary gear 21 the first electric motor 20, the second electric motor 23 and the transmission 22 in order from the side closer to the internal combustion engine 5 in FIG. 1, i.e., in order from the front to the rear. All of these are stored within the casing member 14 (see FIG. 1) and are disposed in line around the axis 13 in order from the front along the axis 13. These devices will be explained below in the order of the power splitting planetary gear 21, the first electric motor 20, the second electric motor 23 and the transmission 22.

The power splitting planetary gear 21 is composed of the double pinion planetary gear disposed coaxially with the output shaft 12. The power splitting planetary gear 21 has the carrier (third rotary element) CR0 supporting the plurality of pinions P0, the sun gear (second rotary element) S0 engaging with the pinion P01 and the ring gear (first rotary element) R0 engaging with the pinion P02. The ring gear R0 of the power splitting planetary gear 21 is coupled with the input shaft 10, the sun gear S0 is coupled with the rotor 25 of the first electric motor 20 and the carrier CR0 is coupled with the output shaft 12. The power splitting planetary gear 21 constructed as described above splits the motive power inputted to the ring gear R0 via the input shaft 10 to the first electric motor 20 via the sun gear S0 and to the output shaft 12 via the ring gear R0 based on the control on the revolution of the first electric motor 20. It is noted that the power split to the first electric motor 20 is used for generating electricity and the power split to the output shaft 12 is used for driving the vehicle 1.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the sun gear S0 of the power splitting planetary gear 21 described later. The first electric motor 20 constructed as described above mainly generates electricity based on the motive power inputted via the sun gear S0 and drives the second electric motor 23 or charges the HV battery (hybrid driving battery) not shown via the inverter not shown.

The second electric motor 23 has the stator 28 fixed to the casing member 14 (see FIG. 1) and the rotor 29 rotatably supported on the inner diametric side of the stator 28. The rotor 29 of the second electric motor 23 is coupled with a sun gear S1 of the transmission 22 described later. Similarly to the first electric motor 20 described above, the second electric motor 23 is connected to the HV battery via the inverter. The second electric motor 23 functions mainly as a driving motor for assisting the motive power (driving force) of the vehicle 1. However, the second electric motor 23 also functions as a generator when the brake is applied to the vehicle for example by regenerating vehicular inertia force as electrical energy.

The transmission 22 has the so-called Ravigneaux type planetary gear unit 27 composed of one double pinion planetary gear and the single planetary gear that uses one of their pinions in common. The transmission 22 also has the first and second brakes B1 and B2.

The planetary gear unit 27 is composed of two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described above, and the carrier CR1, which is an output member (output element), is coupled with the output shaft 12. This transmission 22 is arranged so as to be able to change two deceleration stages whose reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

In the transmission 22 constructed as described above, the first brake B1 is engaged and the second brake B2 is released in the low state. Accordingly, the ring gear R1 is locked and the sun gear S2 is freely rotatable in this state. The revolution of the first sun gear S1 described above is largely reduced via the pinion P1 and is transmitted to the carrier CR1. The revolution of the carrier CR1 is then transmitted to the output shaft 12.

When the transmission 22 is in the high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolution and the revolution of the carrier CR1 reduced relatively in small is transmitted to the output shaft 12 at this time.

Thus, the transmission 22 transmits the largely reduced revolution to the output shaft 12 in the low state by engaging the first brake B1 and by releasing the second brake B2, respectively. In contrary, it transmits the revolution reduced relatively in small to the output shaft 12 by releasing the first brake B1 and by engaging the second brake B2, respectively. Because the transmission 22 is thus capable of shifting in the two stages, the second electric motor 23 may be downsized. That is, the transmission 22 enables to use a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

In the hybrid driving unit 7C shown in FIG. 12, all of the four devices of the power splitting planetary gear 21, the first electric motor 20, the second electric motor 23 and the transmission 22 are disposed on the output shaft 12. These are coupled to each other as described below and shown in the figure.

The input shaft 10 is coupled with the ring gear (first rotary element) R0 of the power splitting planetary gear 21. The output shaft 12 is coupled with the carrier (output element) CR1 of the transmission 22 and with the front side of the carrier (third rotary element) CR0 of the power splitting planetary gear 21 through the inner peripheral side of the transmission 22, the second electric motor 23, the first electric motor 20 and the power splitting planetary gear 21. The rotor 25 of the first electric motor 20 is coupled with the sun gear (second rotary element) S0 of the power splitting planetary gear 21. Then, the rotor 29 of the second electric motor 23 is coupled with the sun gear (input element) S1 through the outer peripheral side of the output shaft 12.

In the hybrid driving unit 7C constructed as described above, the motive power inputted to the input shaft 10 is inputted to the ring gear R0 of the power splitting planetary gear 21 to be split (divided) to the sun gear S0 and the carrier CR0 as shown in the skeleton view of FIG. 12. Among them, the motive power split to the sun gear S0 is inputted to the rotor 25 of the first electric motor 20 to be used to generate electricity. The electricity thus generated is charged to the HV battery via the inverter. The second electric motor 23 receives the electricity supplied from the HV battery via the inverter and drives the output shaft 12 via the transmission 22. That is, the motive power from the internal combustion engine 5 is combined with the power from the second electric motor 23 and is outputted to the output shaft 12. It is noted that because the transmission 22 is arranged so as to be capable of switching between the high and low states as described above, power corresponding to the high or low state is outputted to the output shaft 12.

Since the first electric motor 20 and the second electric motor 23 are disposed adjacently to each other on the axis 13 as shown in FIG. 12 in the present embodiment, the parts of the case storing these first and second electric motors 20 and 23 may be combined, thus facilitating the accommodation in producing the unit in series. It also brings about such effects that a number of parts and, hence the cost, may be reduced, the accuracy for supporting the two electric motors 20 and 23 may be improved, the length of power cables of the two electric motors 20 and 23 may be almost equalized regardless of the position of the controller for controlling them, the length of the cable may be minimized when the inverter is disposed within an engine room on the front side of the vehicle, thus minimizing the loss of electricity, and others.

Fourth Embodiment

Next, a hybrid driving unit 7D of a fourth embodiment will be explained as another example of the inventive hybrid driving unit 7 mounted to the vehicle 1 shown in FIG. 1 with reference to the skeleton view in FIG. 13. It is noted that in the figure, the direction indicated by the arrow F denotes the front side of the body (the internal combustion engine side) and the direction indicated by the arrow R denotes the rear side thereof (the differential unit side).

Figure 13:
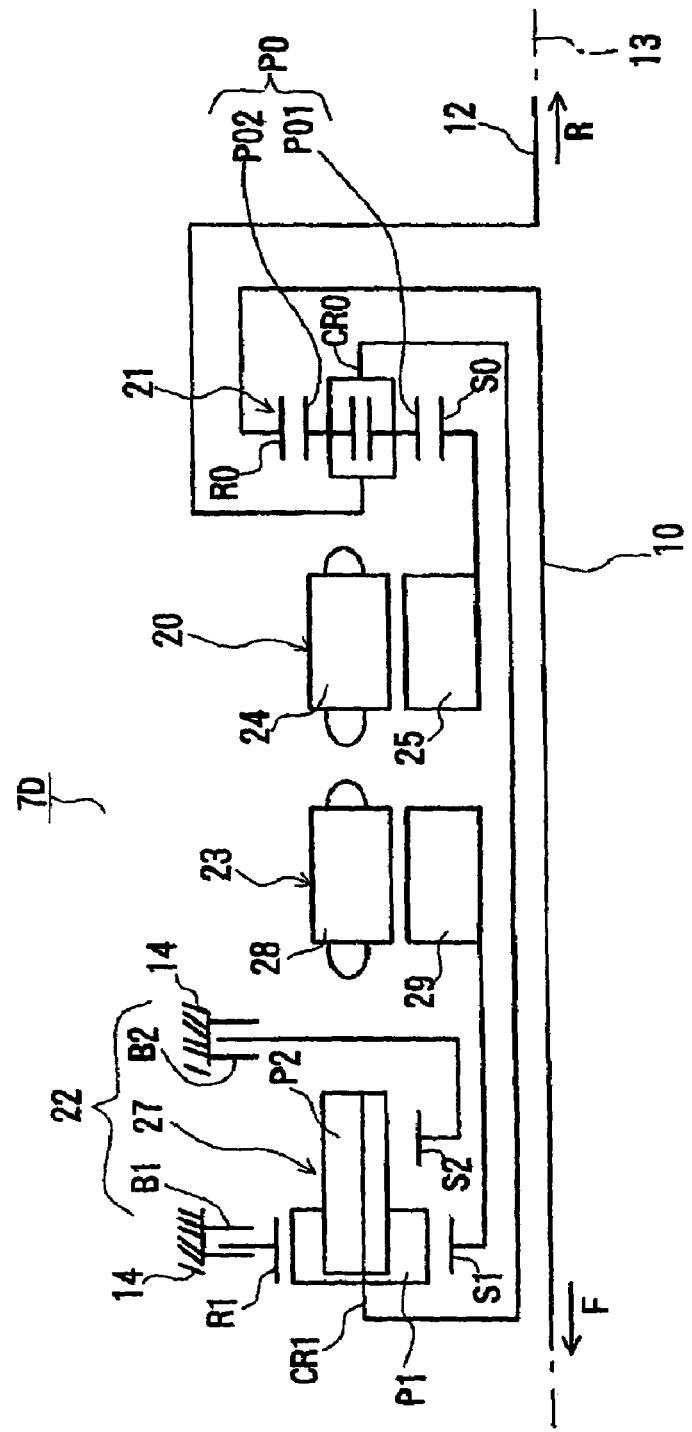
FIG. 13 is a skeleton view showing a hybrid driving unit of a fourth embodiment.

As shown in FIG. 13, the hybrid driving unit 7D comprises the transmission 22, the second electric motor 23, the first electric motor 20 and the power splitting planetary gear 21 in order from the side closer to the internal combustion engine 5 in FIG. 1, i.e., in order from the front to the rear. All of these are stored within the casing member 14 (see FIG. 1) and are disposed in line around the axis 13 in order from the front along the axis 13. These devices will be explained below in the order of the transmission 22, the second electric motor 23, the first electric motor 20 and the power splitting planetary gear 21.

The transmission 22 has the so-called Ravigneaux type planetary gear unit 27 composed of one double pinion planetary gear and the single planetary gear that uses one of their pinions in common. The transmission 22 also has the first and second brakes B1 and B2.

The planetary gear unit 27 is composed of the two sun gears S1 and S2, the carrier CR1 supporting the pinion P1 and the pinion (common long pinion) P2, and the ring gear R1. Among the two pinions P1 and P2, the pinion P1 engages with the sun gear S1 and the ring gear R1, and the pinion P2, i.e., the common long pinion, engages with the sun gear S2 and the pinion P1. The ring gear R1 of the planetary gear unit 27 is coupled with the first brake B1 and the sun gear S2 is coupled with the second brake B2. As a whole, the sun gear S1, which is an input member (input element), is coupled with the rotor 29 of the second electric motor 23 described later, and the carrier CR1, which is an output member (output element), is coupled with the output shaft 12 via the carrier CR0 of the power splitting planetary gear 21 described later. This transmission 22 is arranged so as to be able to change two deceleration stages whose reduction ratios are different by engaging one of the first and second brakes B1 and B2 while releasing the other and by releasing the one while engaging the other. That is, the transmission 22 is arranged so as to change the degree of the motive power inputted from the second electric motor 23 described above via the sun gear S1 and to transmit it to the output shaft 12 via the carrier CR1.

In the transmission 22 constructed as described above, the first brake B1 is engaged and the second brake B2 is released in the low state. Accordingly, the ring gear R1 is locked and the sun gear S2 is freely rotatable in this state. The revolution of the first sun gear S1 described above is largely reduced via the pinion P1 and is transmitted to the carrier CR1. The revolution of the carrier CR1 is then transmitted to the output shaft 12.

When the transmission 22 is in the high state, the first brake B1 is released and the second brake B2 is engaged. Accordingly, the sun gear S2 is locked and the ring gear R1 is freely rotatable in this state. In this state, the revolution of the sun gear S1 is transmitted to the pinion P1 and the pinion P2 engages with the locked sun gear S2. Then, the carrier CR1 moves around the sun gear at a restricted predetermined number of revolution and the revolution of the carrier CR1 reduced relatively in small is transmitted to the output shaft 12 at this time.

Thus, the transmission 22 transmits the largely reduced revolution to the output shaft 12 in the low state by engaging the first brake B1 and by releasing the second brake B2, respectively. In contrary, it transmits the revolution reduced relatively in small to the output shaft 12 by releasing the first brake B1 and by engaging the second brake B2, respectively. Because the transmission 22 is thus capable of shifting in the two stages, the second electric motor 23 may be downsized. That is, the transmission 22 enables to use a small electric motor, to transmit sufficient driving torque to the output shaft 12 in the low state in starting the vehicle 1 when high torque is required, and to prevent the rotor 29 from rotating at high-speed by putting it in the high state when the output shaft 12 is rotating at high-speed.

The second electric motor 23 has the stator 28 fixed to the casing member 14 (see FIG. 1) and the rotor 29 rotatably supported on the inner diametric side of the stator 28. The rotor 29 of the second electric motor 23 is coupled with a sun gear S1 of the transmission 22 described above. Similarly to the first electric motor 20 described above, the second electric motor 23 is connected to the HV battery via the inverter. The second electric motor 23 functions mainly as a driving motor for assisting the motive power (driving force) of the vehicle 1. However, it also functions as a generator when the brake is applied to the vehicle for example by regenerating vehicular inertia force as electrical energy.

The first electric motor 20 has the stator 24 fixed to the casing member 14 (see FIG. 1) and the rotor 25 rotatably supported on the inner diametric side of the stator 24. The rotor 25 of the first electric motor 20 is coupled with the sun gear S0 of the power splitting planetary gear 21 described later. The first electric motor 20 constructed as described above mainly generates electricity based on the motive power inputted via the sun gear S0 and drives the second electric motor 23 or charges the HV battery (hybrid driving battery) not shown via the inverter not shown.

The power splitting planetary gear 21 is composed of the double pinion planetary gear disposed coaxially with the input shaft 10. The power splitting planetary gear 21 has the carrier (third rotary element) CR0 supporting the plurality of pinions P0, the sun gear (second rotary element) S0 engaging with the pinion P01 and the ring gear (first rotary element) R0 engaging with the pinion P02. The ring gear R0 of the power splitting planetary gear 21 is coupled with the input shaft 10, the sun gear S0 is coupled with the rotor 25 of the first electric motor 20 and the carrier CR0 is coupled with the output shaft 12. The power splitting planetary gear 21 constructed as described above splits the motive power inputted to the ring gear R0 via the input shaft 10 to the first electric motor 20 via the sun gear S0 and to the output shaft 12 via the carrier CR0 based on the control on the revolution of the first electric motor 20. It is noted that the power split to the first electric motor 20 is used for generating electricity and the power split to the output shaft 12 is used for driving the vehicle 1.

In the hybrid driving unit 7D shown in FIG. 13, all of the four devices of the transmission 22, the second electric motor 23, the first electric motor 20 and the power splitting planetary gear 21 are disposed on the input shaft 10. These are coupled each other as follows as shown in the figure.

The input shaft 10 is coupled with the ring gear (first rotary element) R0 of the power splitting planetary gear 21 through the inner peripheral side of the transmission 22, the second electric motor 23, the first electric motor 20 and the power splitting planetary gear 21 and through the rear side of the power splitting planetary gear 21. The output shaft 12 is coupled with the front side of the carrier (third rotary element) CR0 of the power splitting planetary gear 21 through the outer peripheral side of the power splitting planetary gear 21 and between the power splitting planetary gear 21 and the first electric motor 20. The rotor 25 of the first electric motor 20 is coupled with the sun gear (second rotary element) S0 of the power splitting planetary gear 21. Then, the rotor 29 of the second electric motor 23 is coupled with the sun gear S1 through the inner peripheral side of the sun gear S2.

In the hybrid driving unit 7D constructed as described above, the motive power inputted to the input shaft 10 is inputted to the ring gear R0 of the power splitting planetary gear 21 to be split (divided) to the sun gear S0 and the carrier CR0 as shown in the skeleton view of FIG. 13. Among them, the motive power split to the sun gear S0 is inputted to the rotor 25 of the first electric motor 20 to be used to generate electricity. The electricity thus generated is charged to the HV battery via the inverter. The second electric motor 23 receives the electricity supplied from the HV battery via the inverter and drives the output shaft 12 via the transmission 22. That is, the motive power from the internal combustion engine 5 is combined with the power from the second electric motor 23 and is outputted to the output shaft 12. It is noted that because the transmission 22 is arranged so as to be capable of switching between the high and low states as described above, power corresponding to the high or low state is outputted to the output shaft 12.

Since the first electric motor 20 and the second electric motor 23 are disposed adjacently to each other on the axis 13 as shown in FIG. 13 in the present embodiment, the parts of the case storing these first and second electric motors 20 and 23 may be combined, thus facilitating the accommodation in producing the unit in series. It also brings about such effects that a number of parts and, hence the cost, may be reduced, the accuracy for supporting the two electric motors 20 and 23 may be improved, the length of power cables of the two electric motors 20 and 23 may be almost equalized regardless of the position of the controller for controlling them, the length of the cable may be minimized when the inverter is disposed within an engine room on the front side of the vehicle, thus minimizing the loss of electricity, and others.

It is noted that although the hydraulic actuators have been used for the first and second brakes B1 and B2 explained in the first through fourth embodiments described above, not only the hydraulic actuators, but also other actuators such as an electric actuator using a ball screw mechanism and an electric motor may be used instead. Still more, not only the friction engaging elements, but also an engaging type elements may be used.

Further, it is needless to say that not only the transmission 22 described above in the embodiments, but also an automatic transmission having two, three or more stages, an automatic transmission having an over-drive stage (O/D) or a continuously variable transmission (CVT) may be used. Still more, the output of the transmission 22 may be outputted not only to the output shaft 12 but also to any part of a power transmission system from the output shaft 12 to the driving wheels.

INDUSTRIAL APPLICABILITY

The inventive hybrid driving unit described above is applicable to vehicles and is suitably applicable to FR vehicles.

The invention claimed is:
1. A hybrid driving unit, comprising:
   an input shaft for inputting motive power from an internal combustion engine;
   an output shaft disposed on an axis in line with said input shaft and interlocked with driving wheels;
   a first electric motor disposed on the axis and comprising a stator and a rotor;
   a power splitting planetary gear disposed on the axis and comprising a first rotary element coupled with said input shaft, a second rotary element coupled with the rotor of said first electric motor and a third rotary element coupled with said output shaft;
   a second electric motor disposed on the axis and comprising a stator and a rotor; and
   a transmission disposed on the axis and shifting and transmitting revolution of the rotor of said second electric motor to said output shaft;
   said hybrid driving unit being characterized in that:
   said first electric motor, said power splitting planetary gear, said second electric motor and said transmission are stored in a casing member while being disposed in line on the axis;
   the stators of said first and second electric motors are fixed to said casing member; and
   said first electric motor, said power splitting planetary gear, said second electric motor and said transmission are disposed on the axis so that said first electric motor and said second electric motor adjoin each other on the axis.

2. The hybrid driving unit as set forth in claim 1, characterized in that said casing member comprises a plurality of connected partial cases in a body in the axial direction and said first and second electric motors are stored in one of said partial cases.

3. The hybrid driving unit as set forth in claim 2, characterized in that said casing member comprises a joint section of said partial cases at the part where said transmission and said power splitting planetary gear are stored.

4. The hybrid driving unit as set forth in claim 2, characterized in that said partial case storing said first and second electric motors is divided into a front part close to said internal combustion engine and to a rear part by a partition and the radial size of a motor storage section of the front part is larger than that of a motor storage section of the rear part.

5. The hybrid driving unit as set forth in claim 4, characterized in that partitions extending from said casing member support the both sides of the rotors of said first and second electric motors through an intermediary of bearing members;
   wherein one of said partitions is located between said first electric motor and said second electric motor and comprises bearing members supporting the rotors of said first and second electric motors, respectively.

6. The hybrid driving unit as set forth in claim 5, characterized in that said input shaft is supported by the inner peripheral face of the rotor of said first electric motor through an intermediary of bearing members provided on the outer peripheral face of said input shaft.

7. The hybrid driving unit as set forth in claim 1, characterized in that said first electric motor, said second electric motor, said transmission and said power splitting planetary gear are disposed in order from the side closer to said internal combustion engine.

8. The hybrid driving unit as set forth in claim 7, characterized in that said input shaft is coupled with said first rotary element through the inner periphery of said first electric motor, said second electric motor and said transmission, and an output element of said transmission is coupled with said output shaft through the outer periphery of said power splitting planetary gear.

9. The hybrid driving unit as set forth in claim 8, characterized in that said power splitting planetary gear comprises a single pinion planetary gear;
   said input shaft is coupled with a rear side of a carrier of said single pinion planetary gear through the inner periphery of said power splitting planetary gear;
   said output shaft is coupled with said output element of said transmission via a ring gear of said single pinion planetary gear; and
   the rotor of said first electric motor is coupled with a sun gear of said single pinion planetary gear through the inner periphery of said second electric motor and said transmission.

10. The hybrid driving unit as set forth in claim 8, characterized in that said power splitting planetary gear comprises a single pinion planetary gear;
    said input shaft is coupled with the transmission side of a carrier of said single pinion planetary gear;
    said output shaft is coupled with a sun gear of said single pinion planetary gear and with the output element of said transmission through the outer periphery of said power splitting planetary gear; and
    the rotor of said first electric motor is coupled with a ring gear of said single pinion planetary gear through the inner periphery of said second electric motor and said transmission.

11. The hybrid driving unit as set forth in claim 8, characterized in that said power splitting planetary gear comprises a double pinion planetary gear;
    said input shaft is coupled with a ring gear of said double pinion planetary gear through the rear side of said power splitting planetary gear;
    said output shaft is coupled with the transmission side of a carrier of said double pinion planetary gear through the outer periphery of said power splitting planetary gear and with the output element of said transmission; and
    the rotor of said first electric motor is coupled with a sun gear of said double pinion planetary gear through the inner periphery of said second electric motor and said transmission.

12. The hybrid driving unit as set forth in claim 8, characterized in that said power splitting planetary gear comprises a double pinion planetary gear;
    said input shaft is coupled with the ring gear of said double pinion planetary gear through the rear side of said power splitting planetary gear;
    said output shaft is coupled with the sun gear of said double pinion planetary gear and with the output element of said transmission through the outer periphery of said power splitting planetary gear and between said power splitting planetary gear and said transmission; and
    the rotor of said first electric motor is coupled with the rear side of the carrier of said double pinion planetary gear through the inner periphery of said second electric motor and said transmission.

13. The hybrid driving unit as set forth in claim 1, characterized in that said first electric motor, said second electric motor, said power splitting planetary gear and said transmission are disposed in order from the side closer to said internal combustion engine.

14. The hybrid driving unit as set forth in claim 13, characterized in that said input shaft is coupled with the first rotary element through the inner periphery of said first electric motor and said second electric motor;

the rotor of said second electric motor is coupled with said transmission through the outer periphery of said power splitting planetary gear; and said output shaft is coupled with an output element of said transmission and with the third rotary element through the inner periphery of said transmission.

15. The hybrid driving unit as set forth in claim 14, characterized in that said power splitting planetary gear comprises a single pinion planetary gear;

said input shaft is coupled with the transmission side of a carrier of said single pinion planetary gear through the inner periphery of said power splitting planetary gear;

said output shaft is coupled with the output element of said transmission and with a ring gear of said single pinion planetary gear through between said power splitting planetary gear and said transmission;

the rotor of said first electric motor is coupled with a sun gear of said single pinion planetary gear through the inner periphery of said second electric motor; and the rotor of said second electric motor is coupled with an input element of said transmission through the outer periphery of said power splitting planetary gear.

16. The hybrid driving unit as set forth in claim 14, characterized in that said power splitting planetary comprises a single pinion planetary gear;

said input shaft is coupled with the second electric motor side of a carrier of said single pinion planetary gear;

said output shaft is coupled with the output element of said transmission and with a sun gear of said single pinion planetary gear;

the rotor of said first electric motor is coupled with the ring gear of said single pinion planetary gear through between said second electric motor and said power splitting planetary gear; and the rotor of said second electric motor is coupled with an input element of said transmission through the outer periphery of said power splitting planetary gear.

17. The hybrid driving unit as set forth in claim 14, characterized in that said power splitting planetary gear comprises a double pinion planetary gear;

said input shaft is coupled with a ring gear of said double pinion planetary gear through between said power splitting planetary gear and said transmission;

said output shaft is coupled with the output element of said transmission and with a sun gear of said double pinion planetary gear through between said power splitting planetary gear and said transmission, through the outer periphery of said power splitting planetary gear and through between said power splitting planetary gear and said second electric motor;

the rotor of said first electric motor is coupled with the transmission side of the carrier of said double pinion planetary gear through the inner peripheral side of said second electric motor and through between said power splitting planetary gear and said transmission; and the rotor of said second electric motor is coupled with an input element of said transmission through the outer periphery of said power splitting planetary gear.

18. The hybrid driving unit as set forth in claim 14, characterized in that said power splitting planetary comprises a double pinion planetary gear;

said input shaft is coupled with a carrier of said double pinion planetary gear through between said power splitting planetary gear and said transmission;

said output shaft is coupled with the output element of said transmission and with the ring gear of said double pinion planetary gear through between said power splitting planetary gear and said transmission;

the rotor of said first electric motor is coupled with the sun gear of said double pinion planetary gear through the inner peripheral side of said second electric motor; and the rotor of said second electric motor is coupled with the input element of said transmission through the outer peripheral side of said power splitting planetary gear.

19. The hybrid driving unit as set forth in claim 1, characterized in that said transmission comprises a planetary gear unit.

20. The hybrid driving unit as set forth in claim 19, characterized in that said transmission comprises at least four shifting elements, the first shifting element is coupled with the rotor of said second electric motor, the second shifting element is coupled with said output shaft, and said transmission comprises braking elements which are capable of fixing the third and fourth shifting elements to said casing member, respectively.

21. The hybrid driving unit as set forth in claim 19, characterized in that said planetary gear of said transmission comprises a Ravigneaux type planetary gear and a carrier of said Ravigneaux type planetary gear is coupled with said output shaft.

22. The hybrid driving unit as set forth in claim 1, characterized in that said power splitting planetary gear, said first electric motor, said second electric motor and said transmission are disposed in order from the side closer to said internal combustion engine.

23. The hybrid driving unit as set forth in claim 22, characterized in that said input shaft is coupled with the first rotary element, and an output element of said transmission is coupled with said output shaft disposed through the inner periphery of said power splitting planetary gear, said first electric motor, said second electric motor and said transmission.

24. The hybrid driving unit as set forth in any one of claim 1, characterized in that said transmission, said second electric motor, said first electric motor and said power splitting planetary gear are disposed in order from the side closer to said internal combustion engine.

25. The hybrid driving unit as set forth in claim 24, characterized in that said input shaft is coupled with the first rotary element through the inner periphery of said transmission, said second electric motor, said first electric motor and said power splitting planetary gear, and the output element of said transmission is coupled with said output shaft through between said input shaft and the inner periphery of said transmission, said second electric motor, said first electric motor and said power splitting planetary gear.

26. A vehicle comprising an internal combustion engine, hybrid driving means and rear wheels as driving wheels to which driving force is transmitted from said hybrid driving means;

said vehicle being characterized in that:
said hybrid driving means is the hybrid driving unit as set forth in claim 1; and
said hybrid driving unit is arranged such that said input shaft is coupled with an output shaft of said internal combustion engine, a propeller shaft is coupled with said output shaft of said internal combustion engine, and said output shaft of said internal combustion engine, said input shaft, said output shaft of said hybrid driving unit and said propeller shaft are disposed approximately on one and the same axis.

* * * * *